United States Patent
Antaya et al.

(10) Patent No.: US 11,738,412 B2
(45) Date of Patent: Aug. 29, 2023

(54) LEAD-FREE SOLDER COMPOSITION

(71) Applicant: Aptiv Technologies Limited, St. Michael (BB)

(72) Inventors: Stephen C. Antaya, West Kingston, RI (US); William Falk, Warwick, RI (US); Justin Amalfitano, East Providence, RI (US); Amit Datta, East Greenwich, RI (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/835,153

(22) Filed: Jun. 8, 2022

(65) Prior Publication Data
US 2022/0324064 A1    Oct. 13, 2022

Related U.S. Application Data

(63) Continuation of application No. 17/027,036, filed on Sep. 21, 2020, now Pat. No. 11,383,330.

(51) Int. Cl.
| | |
|---|---|
| *C22C 13/00* | (2006.01) |
| *C22C 30/04* | (2006.01) |
| *C22C 30/06* | (2006.01) |
| *B23K 35/26* | (2006.01) |
| *B23K 103/12* | (2006.01) |
| *B23K 103/00* | (2006.01) |
| *B23K 103/02* | (2006.01) |

(52) U.S. Cl.
CPC ............ *B23K 35/262* (2013.01); *C22C 13/00* (2013.01); *C22C 30/04* (2013.01); *C22C 30/06* (2013.01); *B23K 2103/02* (2018.08); *B23K 2103/12* (2018.08); *B23K 2103/54* (2018.08); *Y10T 428/12597* (2015.01); *Y10T 428/12715* (2015.01); *Y10T 428/12722* (2015.01)

(58) Field of Classification Search
None
See application file for complete search history.

(56) References Cited

U.S. PATENT DOCUMENTS

| | | |
|---|---|---|
| 6,680,128 B2 | 1/2004 | Mei |
| 6,767,411 B2 | 7/2004 | Yeh et al. |
| 7,617,964 B2 | 11/2009 | Winter et al. |
| 9,931,716 B2 | 4/2018 | Ikeda et al. |

(Continued)

FOREIGN PATENT DOCUMENTS

| | | |
|---|---|---|
| CN | 1154403 A | 7/1997 |
| CN | 104690442 A | 6/2015 |

(Continued)

OTHER PUBLICATIONS

Extended European Search Report Received dated Nov. 2, 2021, 11 pages.
Chinese Office Action Application No. 202111010463.2, dated Dec. 5, 2022, 7 Pages.

*Primary Examiner* — Xiaobei Wang
(74) *Attorney, Agent, or Firm* — Billion & Armitage

(57) ABSTRACT

An electrical assembly includes an electrical connector soldered to a conductive pad disposed on a glass surface by a solder alloy consisting essentially of 17% to 28% indium by weight, 12% to 20% zinc by weight, 1% to 6% silver by weight, 1% to 3% copper by weight, and a remaining weight of the solder alloy being tin.

17 Claims, 27 Drawing Sheets

(56) References Cited

U.S. PATENT DOCUMENTS

| | | |
|---|---|---|
| 9,975,207 B2 | 5/2018 | Hwang et al. |
| 9,981,347 B2 | 5/2018 | Pereira et al. |
| 10,105,794 B2 | 10/2018 | Hwang et al. |
| 2005/0007234 A1 | 1/2005 | Wada et al. |
| 2006/0067852 A1 | 3/2006 | Suh et al. |
| 2006/0261131 A1 | 11/2006 | Hirata et al. |
| 2008/0318793 A1 | 12/2008 | Somerkoski |
| 2012/0318566 A1 | 12/2012 | Reul et al. |
| 2014/0044589 A1 | 2/2014 | Jeong et al. |
| 2014/0158424 A1* | 6/2014 | Schlarb .................... H01R 4/02 174/94 R |
| 2015/0296615 A1* | 10/2015 | Schmalbuch ............ H05K 1/09 174/257 |
| 2017/0368642 A1 | 12/2017 | Pereira et al. |

FOREIGN PATENT DOCUMENTS

| | | |
|---|---|---|
| CN | 107635717 A | 1/2018 |
| CN | 108436323 A | 8/2018 |
| CN | 109648222 A | 4/2019 |
| CN | 109702372 A | 5/2019 |
| EP | 1614500 A1 | 1/2006 |
| EP | 1922175 B1 | 9/2019 |
| JP | 2000141078 A | 5/2000 |
| JP | 2004307958 A | 11/2004 |
| JP | 2011031253 A * | 2/2011 |
| JP | 2011031253 A | 2/2011 |
| TW | I301854 B | 10/2008 |
| WO | 9709455 A1 | 3/1997 |

\* cited by examiner

LEAD-FREE SOLDER COMPOSITION

CROSS REFERENCE TO RELATED APPLICATIONS

This application is a continuation of co-pending U.S. patent application Ser. No. 17/027,036 filed on Sep. 21, 2020, the entire disclosure of which is hereby incorporated by reference.

TECHNICAL FIELD OF THE INVENTION

The present invention relates generally to lead-free solder compositions and more particularly to lead-free solder compositions suitable for electrical terminals attached to an electrical contact pad, for example on a glass surface.

BACKGROUND OF THE INVENTION

Lead-based solder has been used for soldering electrical terminals to silver grids printed on automotive glass since the heated grid was developed. Indium-based solders were used under special circumstances on annealed glass windshields where the product was particularly sensitive to cracking. Physical properties of high indium-based solders provided better resistance to cracking than leaded solder but was cost prohibitive in regular production.

In the year 2000, the European Union issued a directive to prohibit the use of lead in automotive glass applications after 2003. Although lead would be exempted from this directive for many years, some OEMs and glass suppliers were proactive in the validation and use of lead-free solder. Indium-based lead-free solders developed by Antaya Technologies Corporation have been widely used by glass suppliers globally for both tempered and annealed automotive glass.

The higher cost of indium versus other solder alloy metals has been a barrier to wider application of indium-based lead-free solder. As an alternative, some glass suppliers have developed a process to use high tin (98% tin, 2% silver) solder in combination with an electrical terminal having a stainless-steel base material for tempered glass applications. This high tin solder has the advantage of being inexpensive and the stainless steel provides the benefit of a coefficient of thermal expansion that is close to that of tempered glass. However, this alternative still has drawbacks of causing some glass cracking, a narrow processing temperature window, additional process steps of preheating, controlled cooling of the glass, and a need for silver plating to improve electrical conductivity.

Therefore, the need for electrical terminal capable of being soldered on tempered automotive glass using a lower cost solder than lead-free solder having a high, i.e., greater than 50%, indium content and avoids the drawbacks of the high-tin solder/stainless steel solution described above remains desired.

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

According to one embodiment, an electrical assembly is provided. The electrical assembly includes an electrical connector having a first layer formed on a copper based material and a second layer formed of an iron-nickel alloy. The second layer has a thickness 8% to 30% of the thickness of the electrical connector. The electrical assembly further includes a layer of a solder alloy consisting essentially of about 15% to 28% indium by weight, about 5% to 20% zinc by weight, about 1% to 6% silver by weight, and a remaining weight of the solder alloy being tin.

In an example embodiment having one or more features of the electrical assembly of the previous paragraph, the solder alloy consists essentially of 21% to 27% indium by weight, 8% to 10% zinc by weight, 2% to 4% silver by weight, and a remaining weight of the solder alloy being tin.

In an example embodiment having one or more features of the electrical assembly of one or more of the previous paragraphs, the solder alloy consists essentially of: about 24% indium by weight, about 9% zinc by weight, about 3% silver by weight, and a remaining weight of the solder alloy being tin.

In an example embodiment having one or more features of the electrical assembly of one or more of the previous paragraphs, the second layer is soldered to a silver-based connection pad.

In an example embodiment having one or more features of the electrical assembly of one or more of the previous paragraphs, silver-based connection pad is disposed on a glass surface.

According to one embodiment, an electrical assembly is provided. The electrical assembly includes an electrical connector soldered to a conductive pad disposed on a glass surface by a solder alloy consisting essentially of 17% to 28% indium by weight, 12% to 20% zinc by weight, 1% to 6% silver by weight, and a remaining weight of the solder alloy being tin.

In an example embodiment having one or more features of the electrical assembly of the previous paragraph, the solder alloy includes about 18% indium by weight.

In an example embodiment having one or more features of the electrical assembly of one or more of the previous paragraphs, the solder alloy includes about 22% indium by weight.

In an example embodiment having one or more features of the electrical assembly of one or more of the previous paragraphs, the solder alloy includes about 24% indium by weight.

In an example embodiment having one or more features of the electrical assembly of one or more of the previous paragraphs, the solder alloy includes about 3% silver by weight.

In an example embodiment having one or more features of the electrical assembly of one or more of the previous paragraphs, the solder alloy includes about 5% silver by weight.

In an example embodiment having one or more features of the electrical assembly of one or more of the previous paragraphs, the electrical connector has a first layer formed on a copper based material and a second layer formed of an iron-nickel alloy and wherein the second layer has a thickness 8% to 30% of the thickness of the electrical connector.

According to one embodiment, an electrical assembly is provided. The electrical assembly includes an electrical connector soldered to a conductive pad disposed on a glass surface by a solder alloy consisting essentially of 17% to 28% indium by weight, 12% to 20% zinc by weight, 1% to 6% silver by weight, 1% to 3% copper by weight, and a remaining weight of the solder alloy being tin.

In an example embodiment having one or more features of the electrical assembly of the previous paragraph, the solder alloy includes about 18% indium by weight.

In an example embodiment having one or more features of the electrical assembly of one or more of the previous paragraphs, the solder alloy includes about 22% indium by weight.

In an example embodiment having one or more features of the electrical assembly of one or more of the previous paragraphs, the solder alloy includes about 24% indium by weight.

In an example embodiment having one or more features of the electrical assembly of one or more of the previous paragraphs, the solder alloy includes about 3% silver by weight.

In an example embodiment having one or more features of the electrical assembly of one or more of the previous paragraphs, the solder alloy includes about 5% silver by weight.

In an example embodiment having one or more features of the electrical assembly of one or more of the previous paragraphs, the electrical connector has a first layer formed on a copper based material and a second layer formed of an iron-nickel alloy and wherein the second layer has a thickness 8% to 30% of the thickness of the electrical connector.

BRIEF DESCRIPTION OF THE SEVERAL VIEWS OF THE DRAWING

The present invention will now be described, by way of example with reference to the accompanying drawings, in which.

Figure 10:
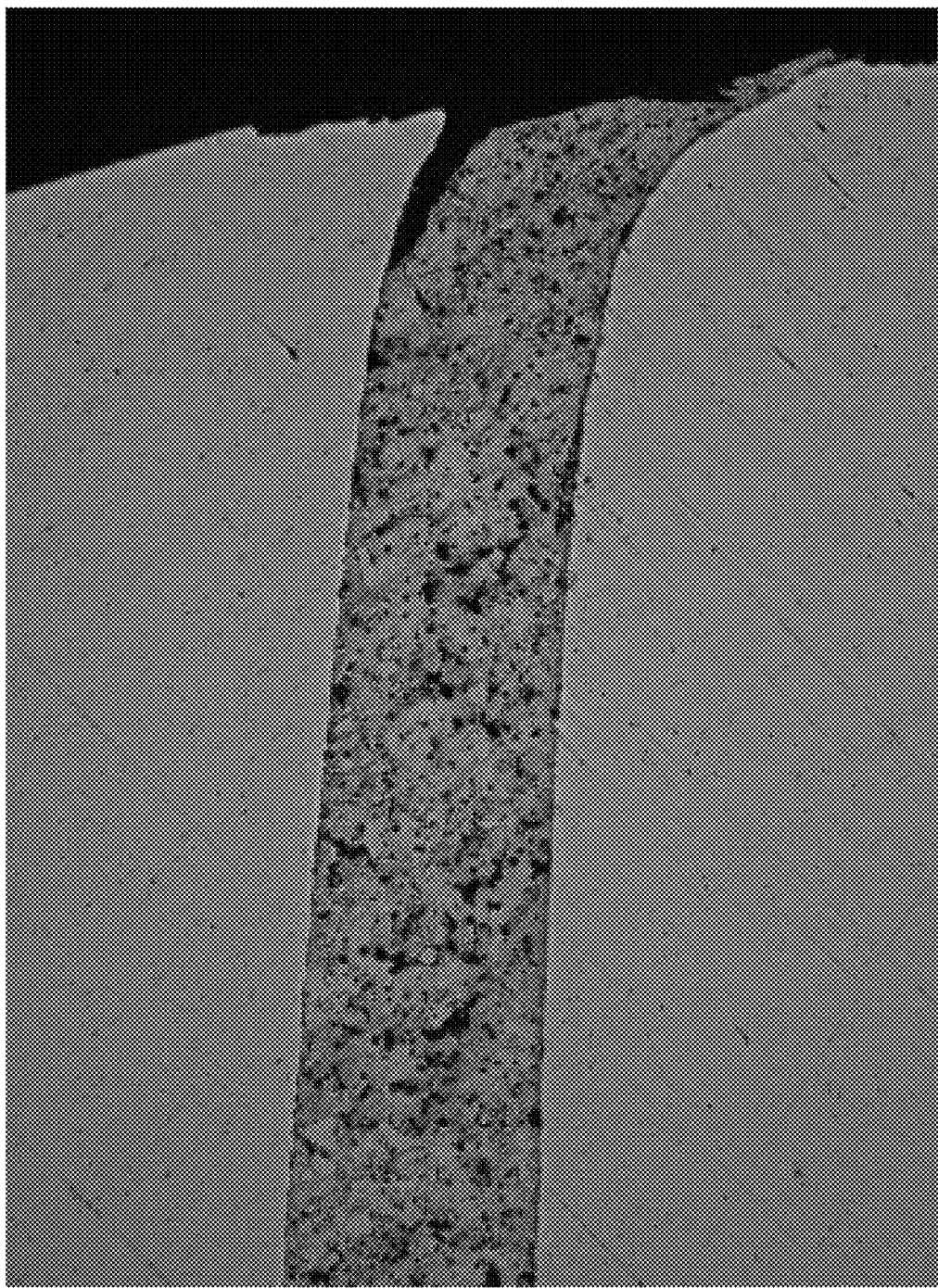
Figure 11:
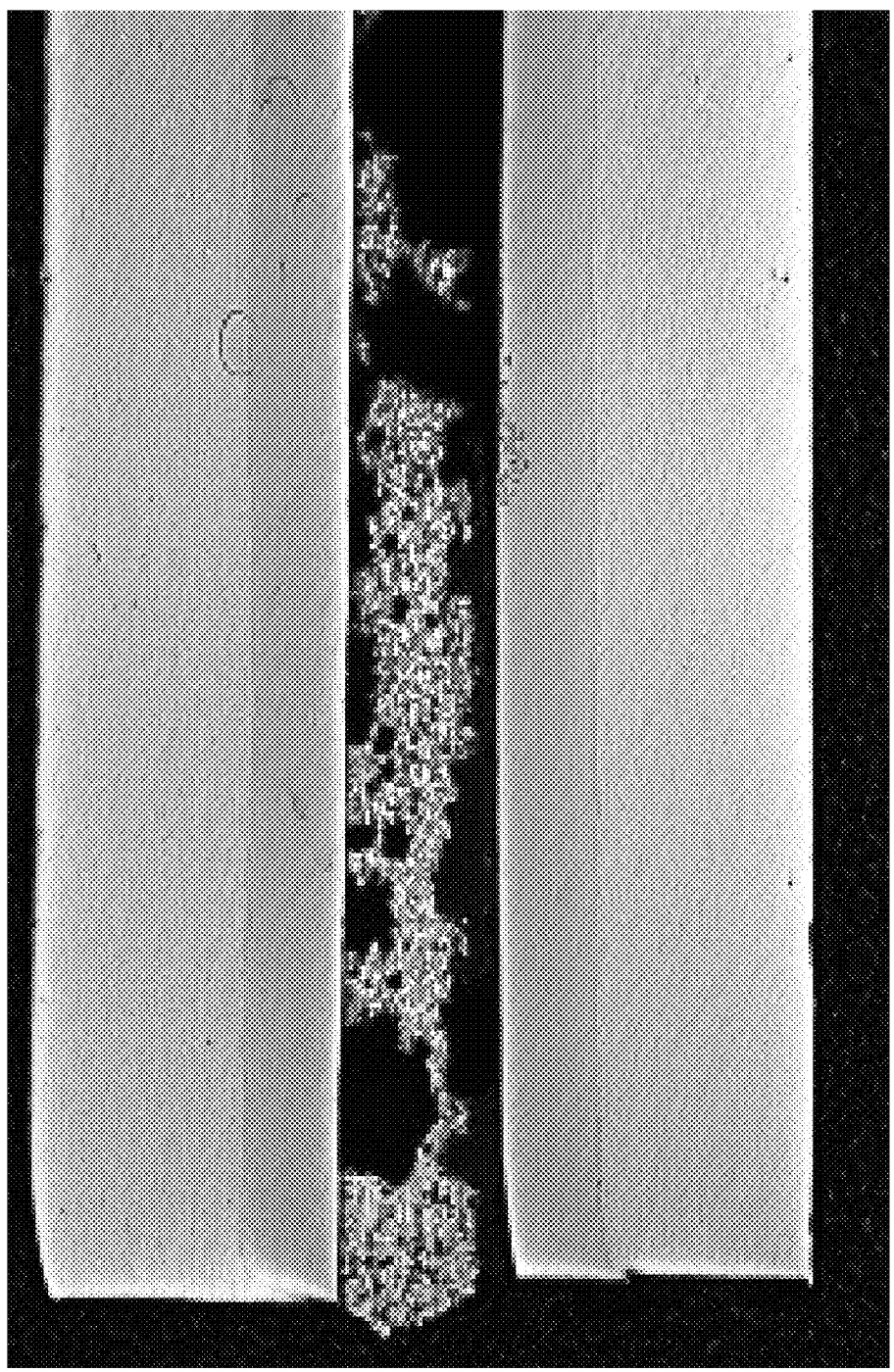
Figure 12:
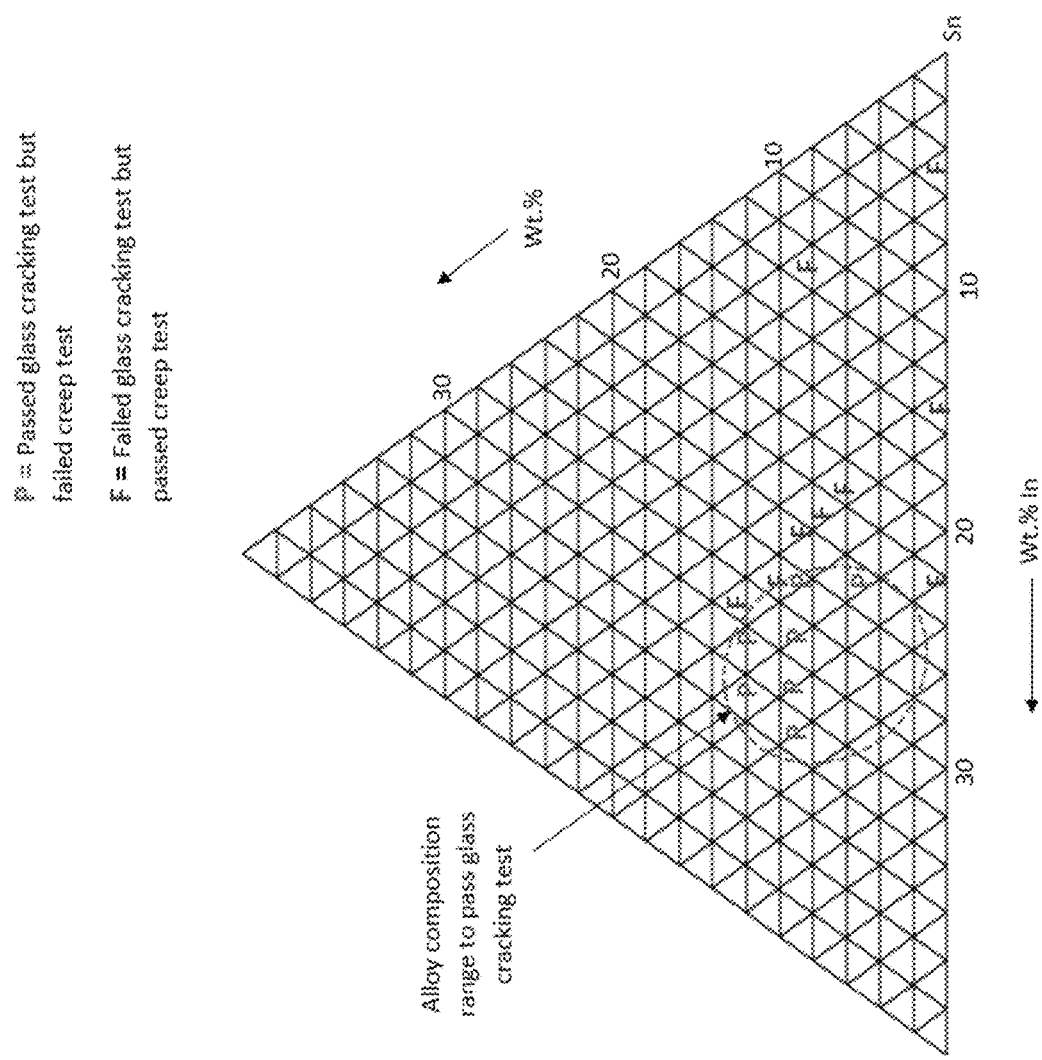
Figure 13:
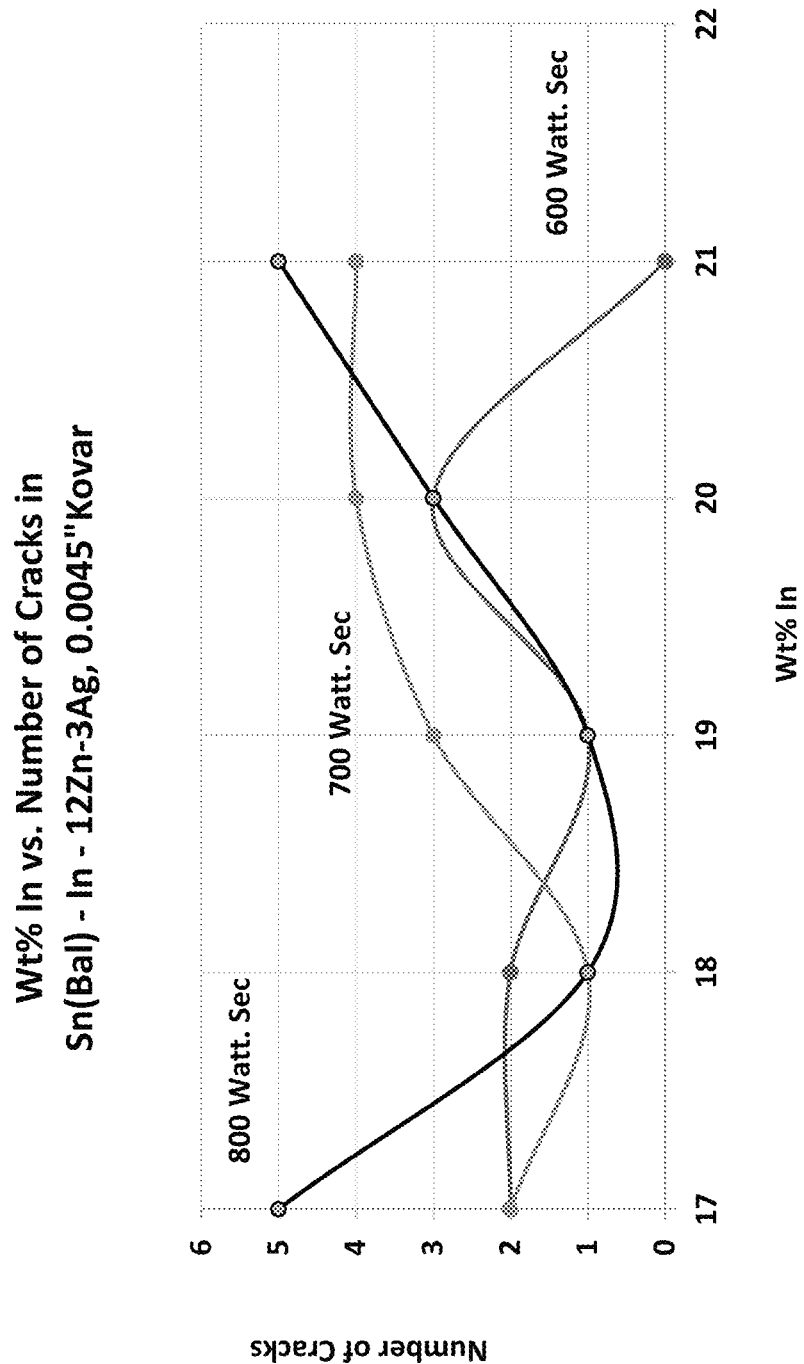
Figure 14:
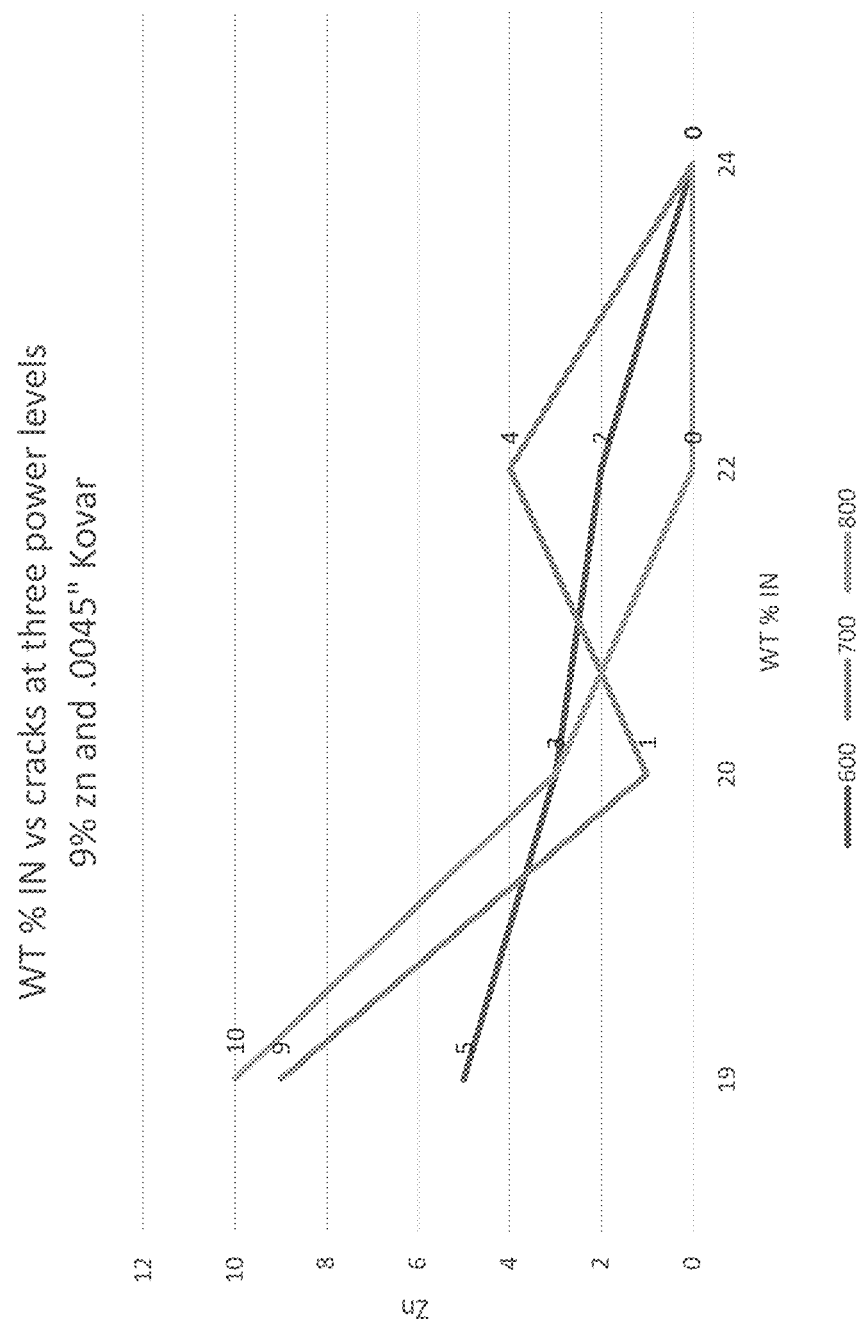
Figure 15:
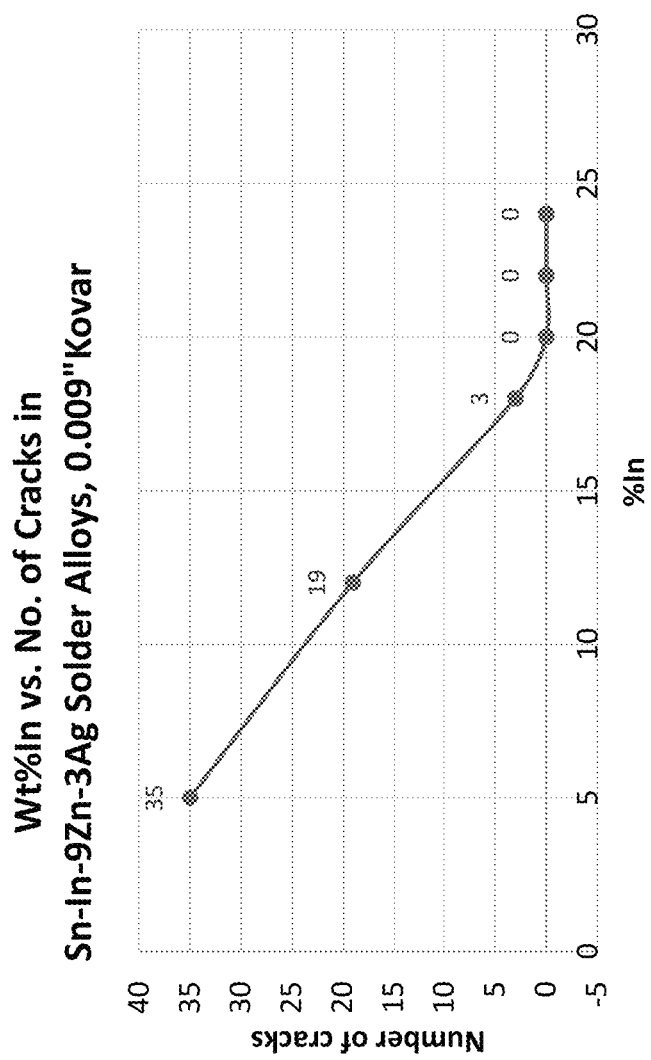
Figure 16:
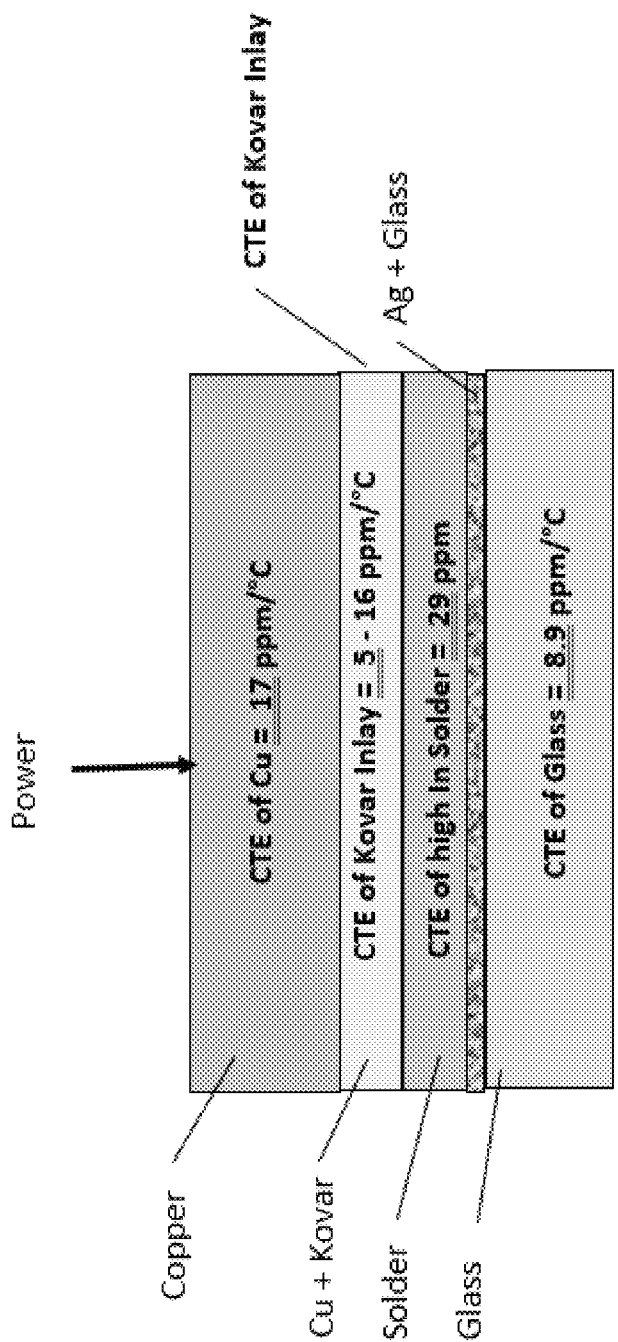
Figure 17:
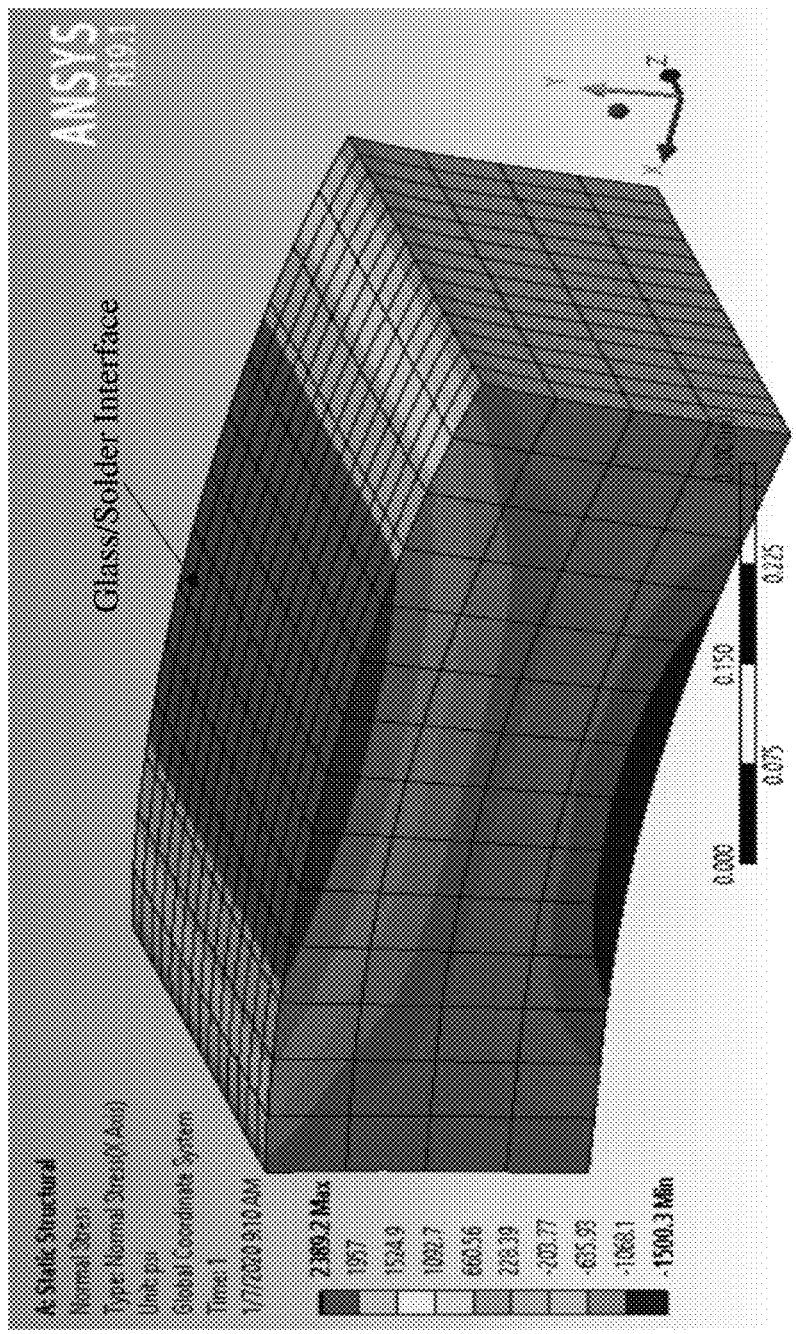
Figure 18:
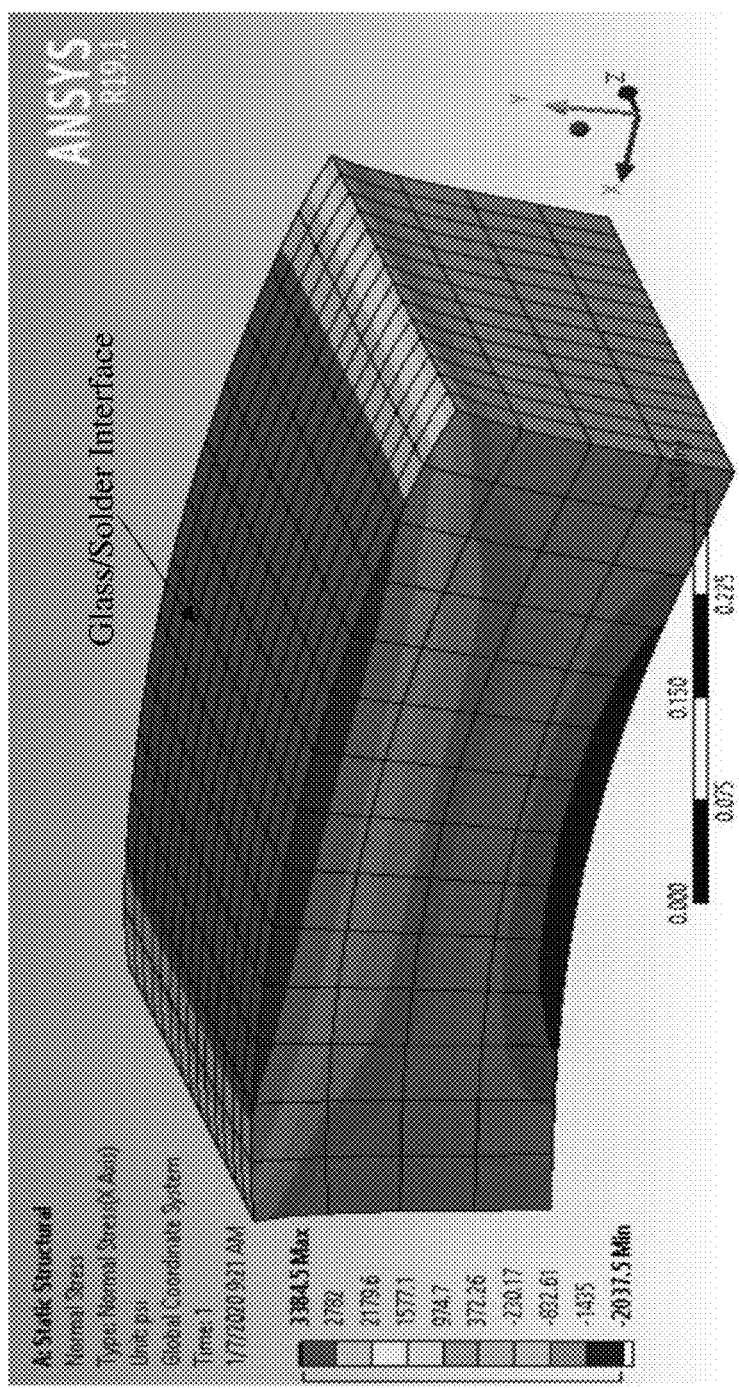
Figure 19:
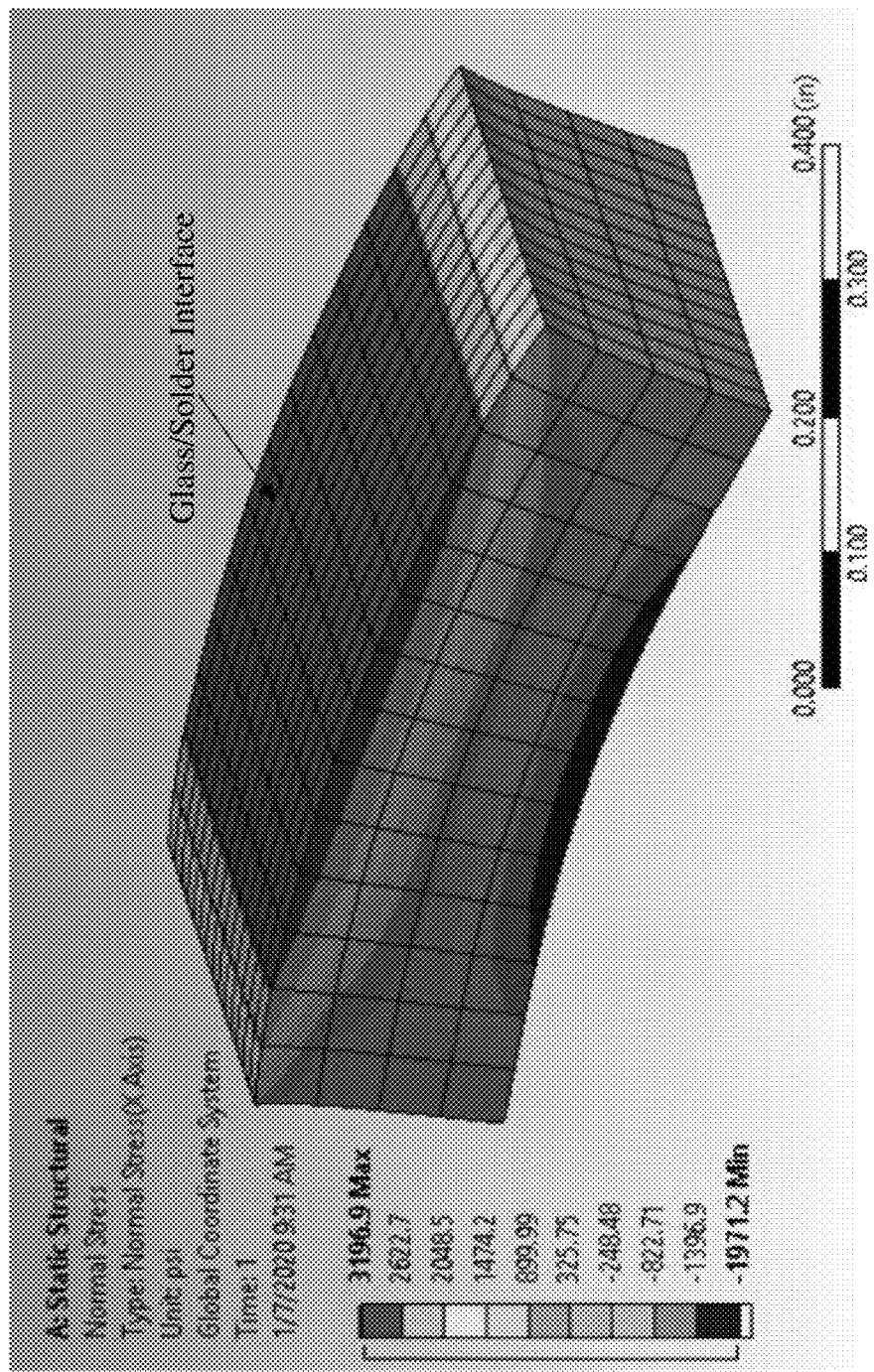
Figure 20:
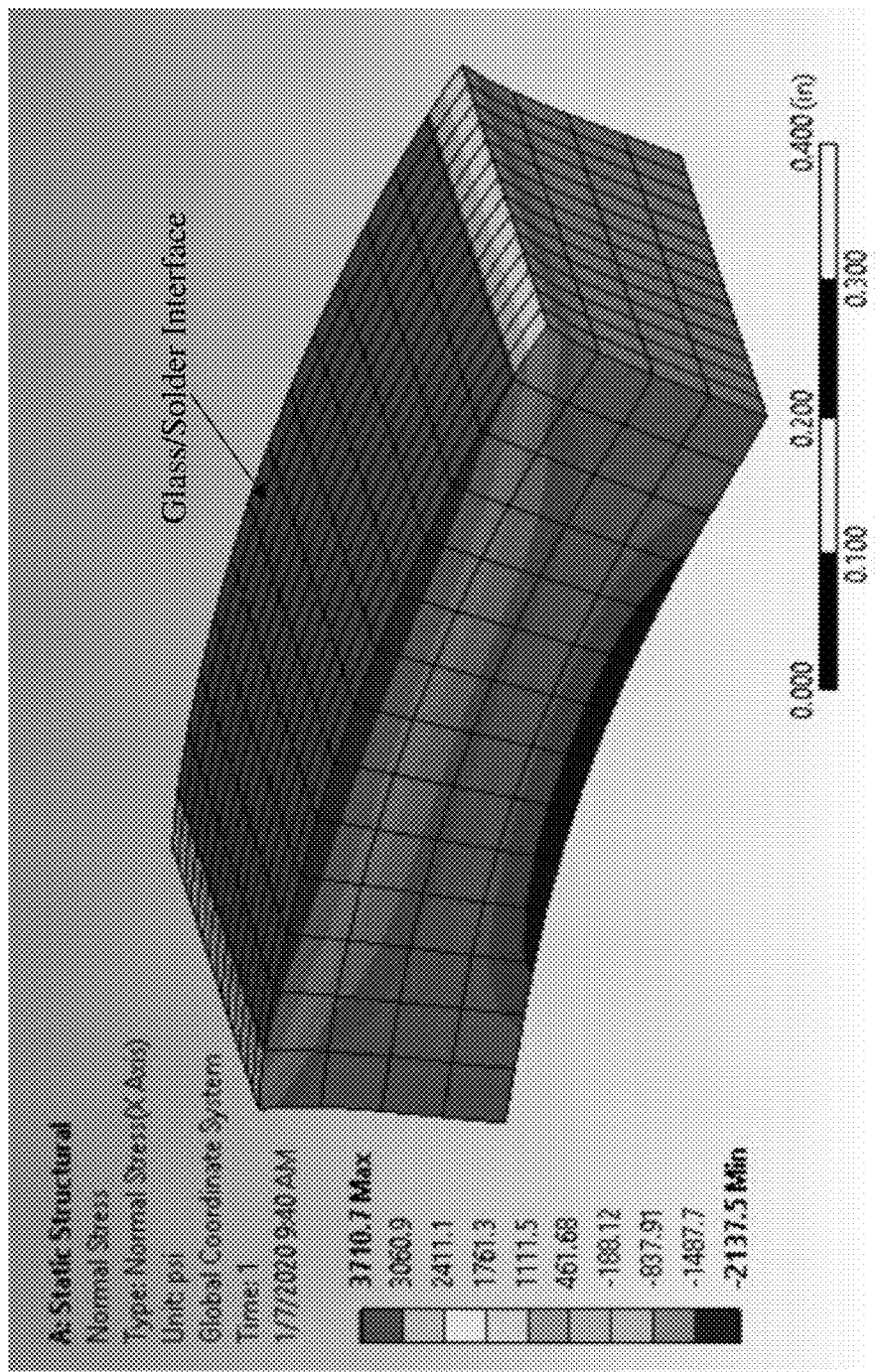
Figure 21A:
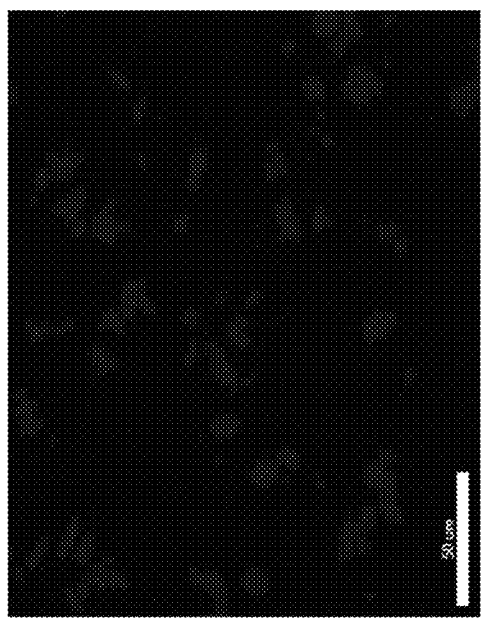
Figure 21B:
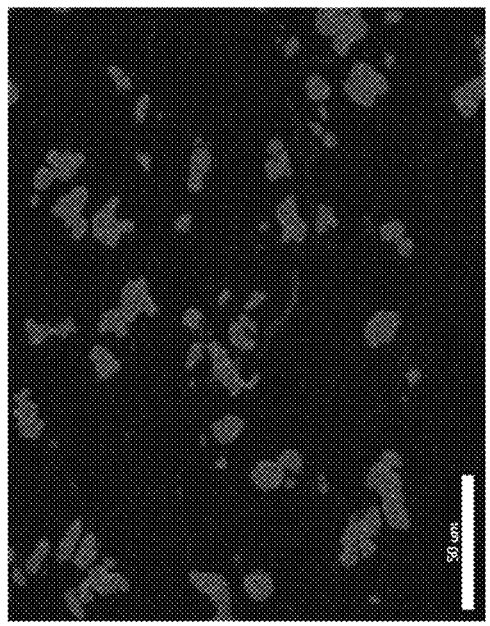
Figure 21C:
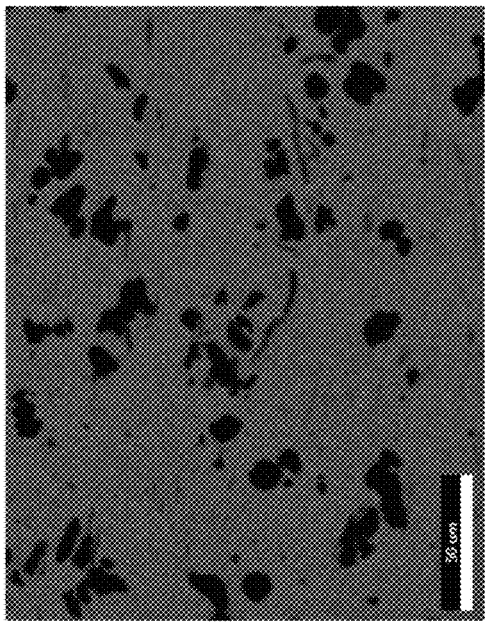
Figure 21D:
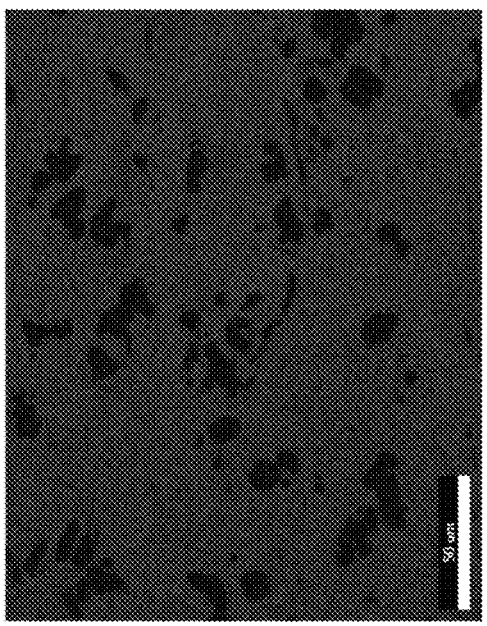
Figure 22B:
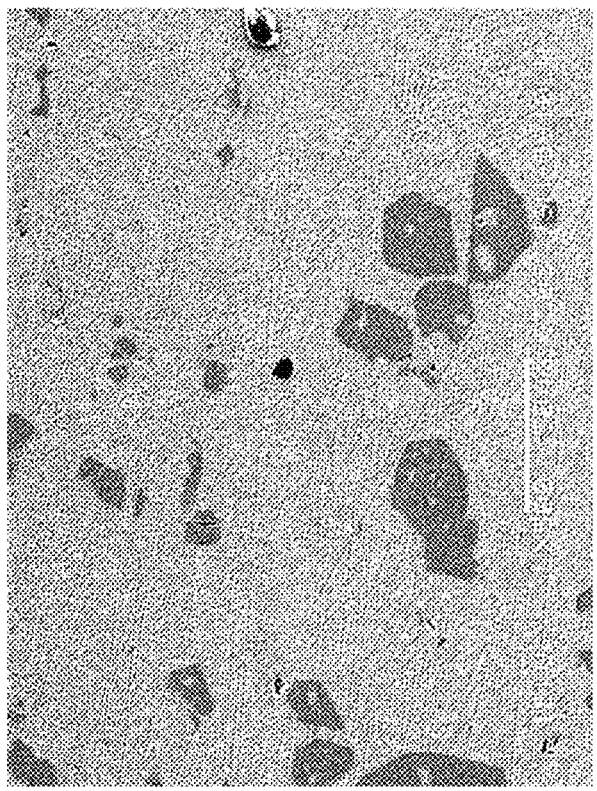
Figure 22A:
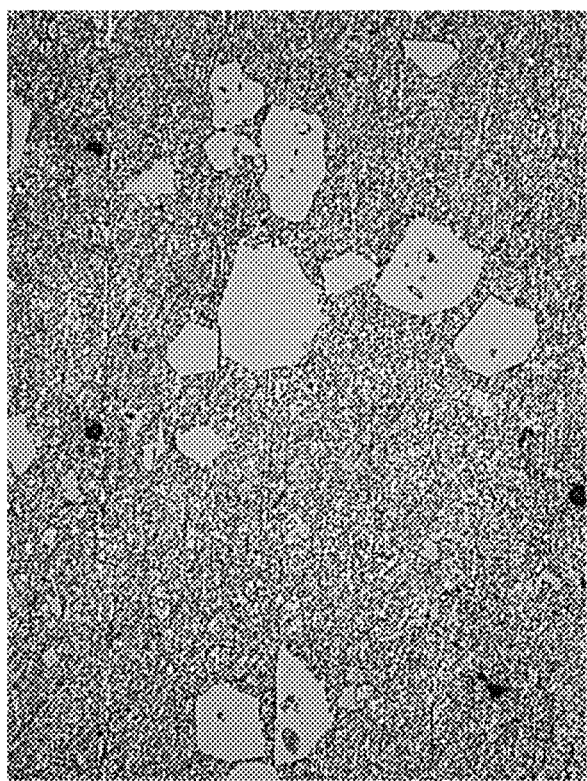
Figure 23B:
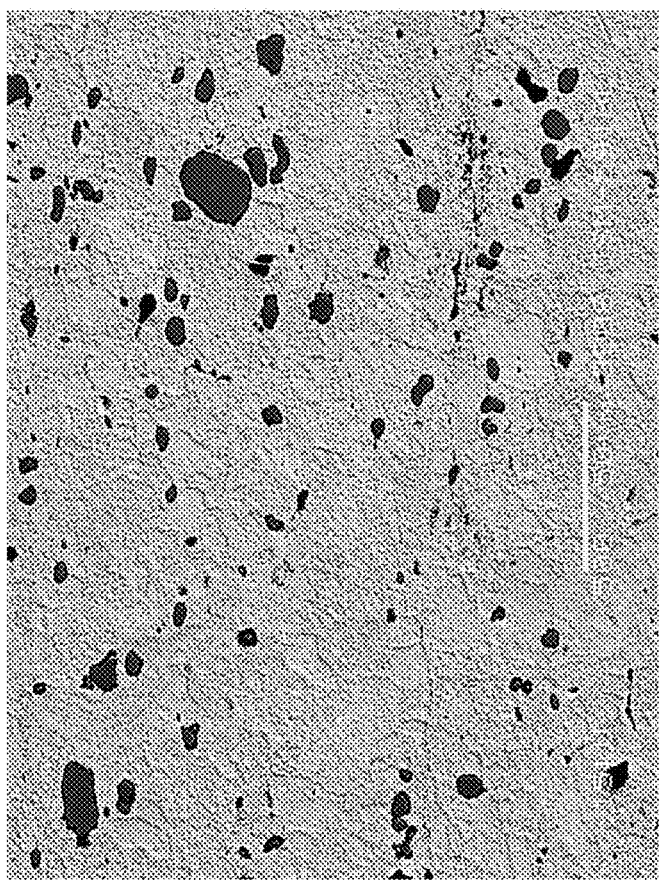
Figure 23A:
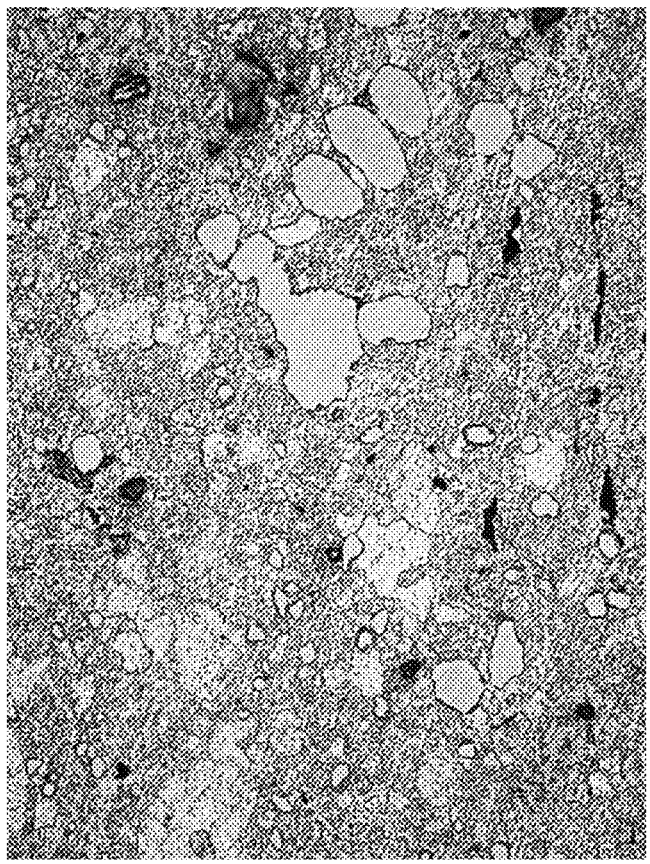
Figure 24B:
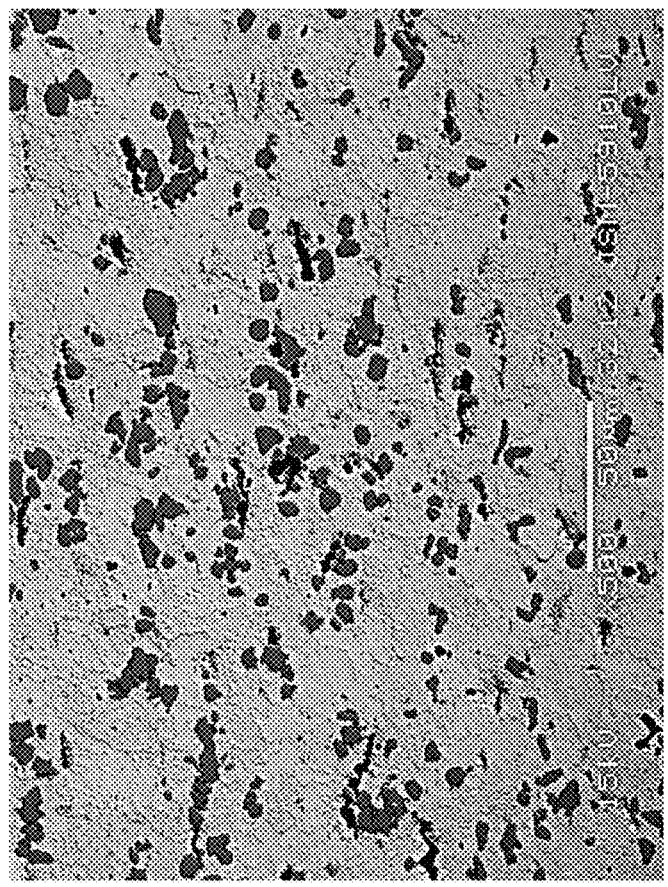
Figure 24A:
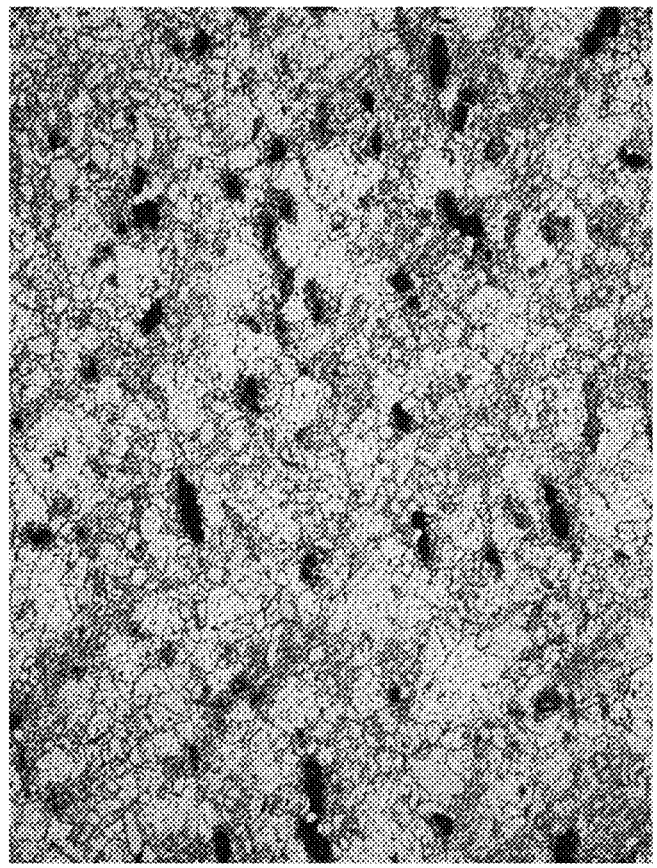
Figure 25:
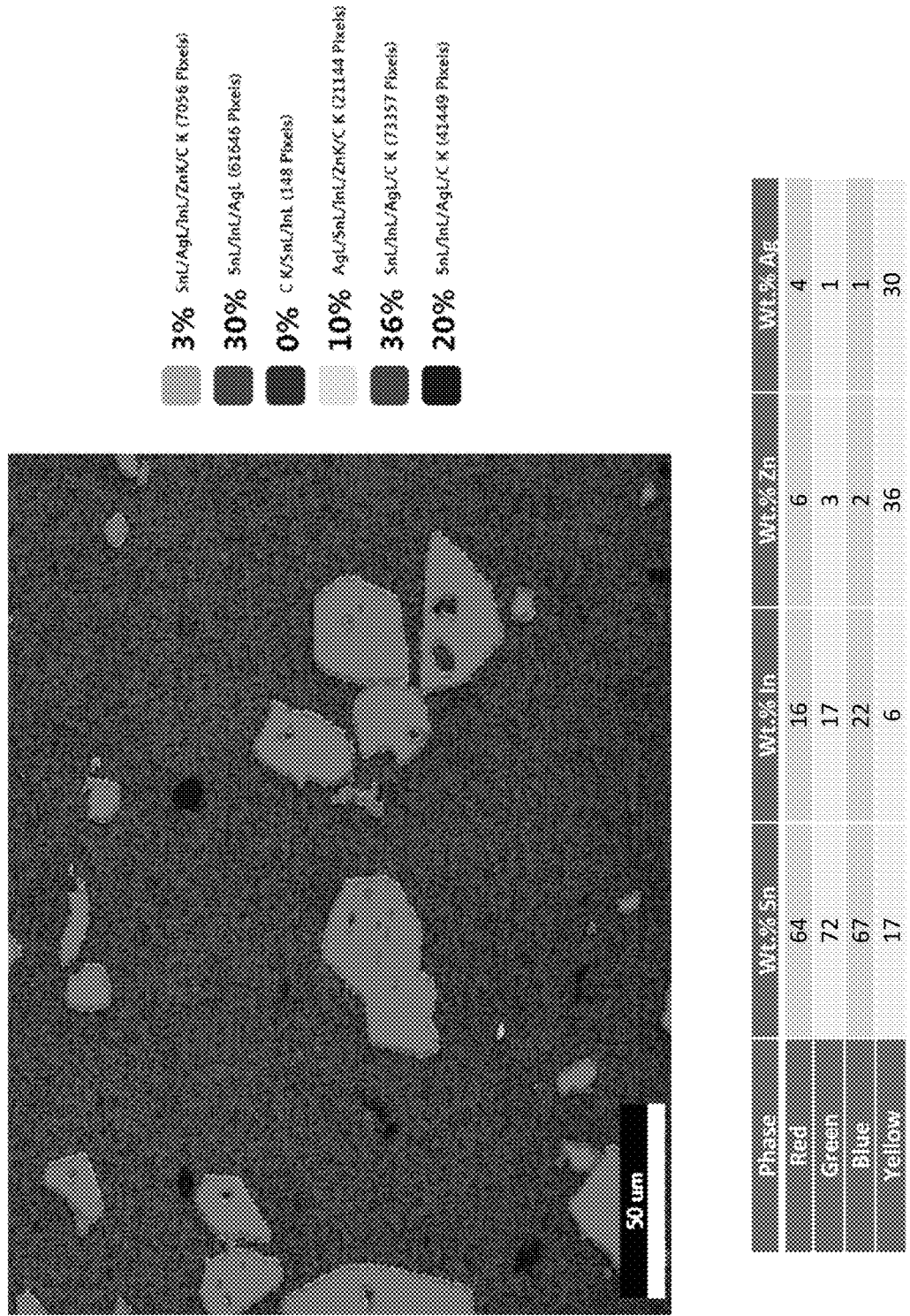
Figure 26:
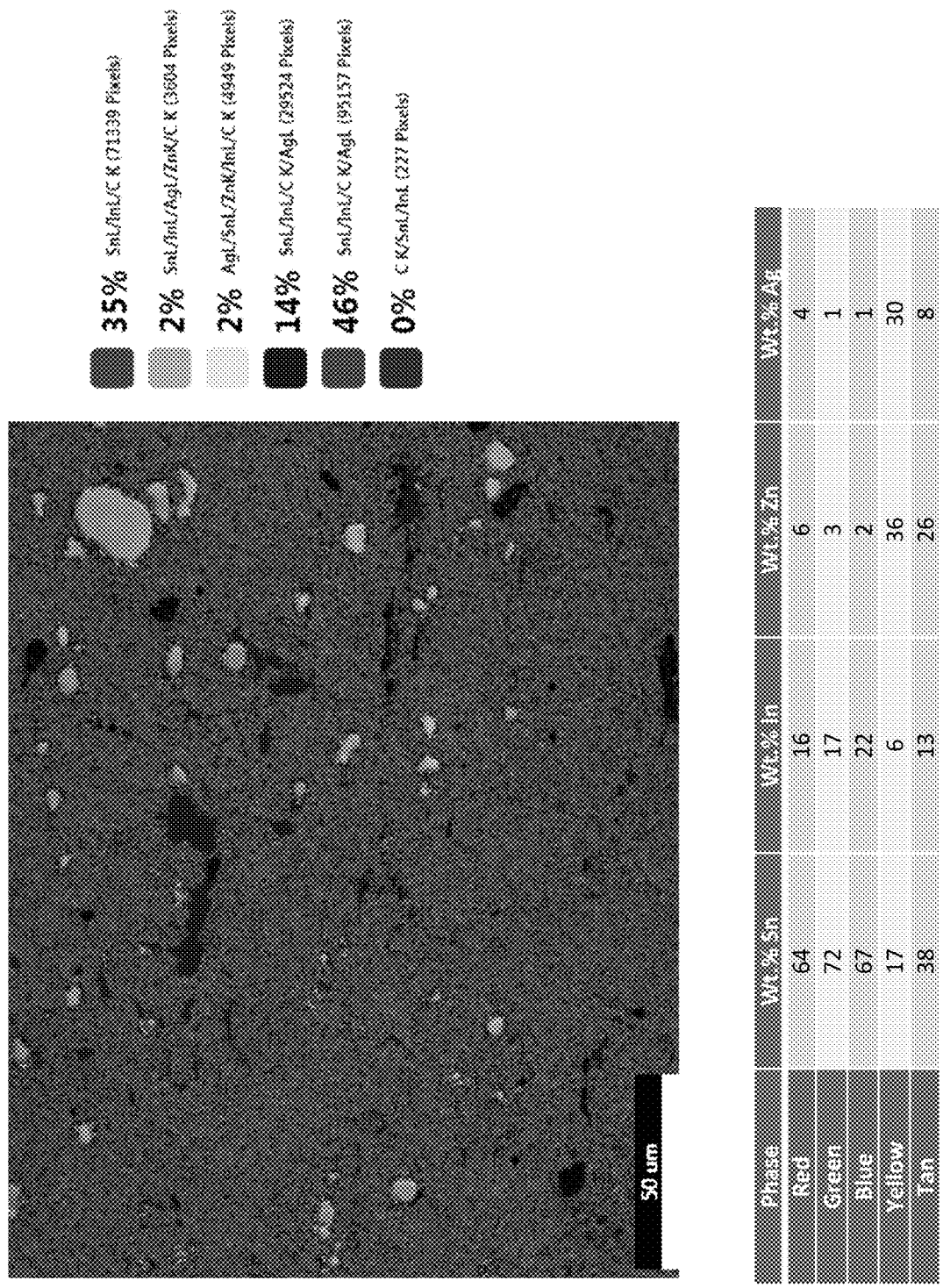
Figure 27:
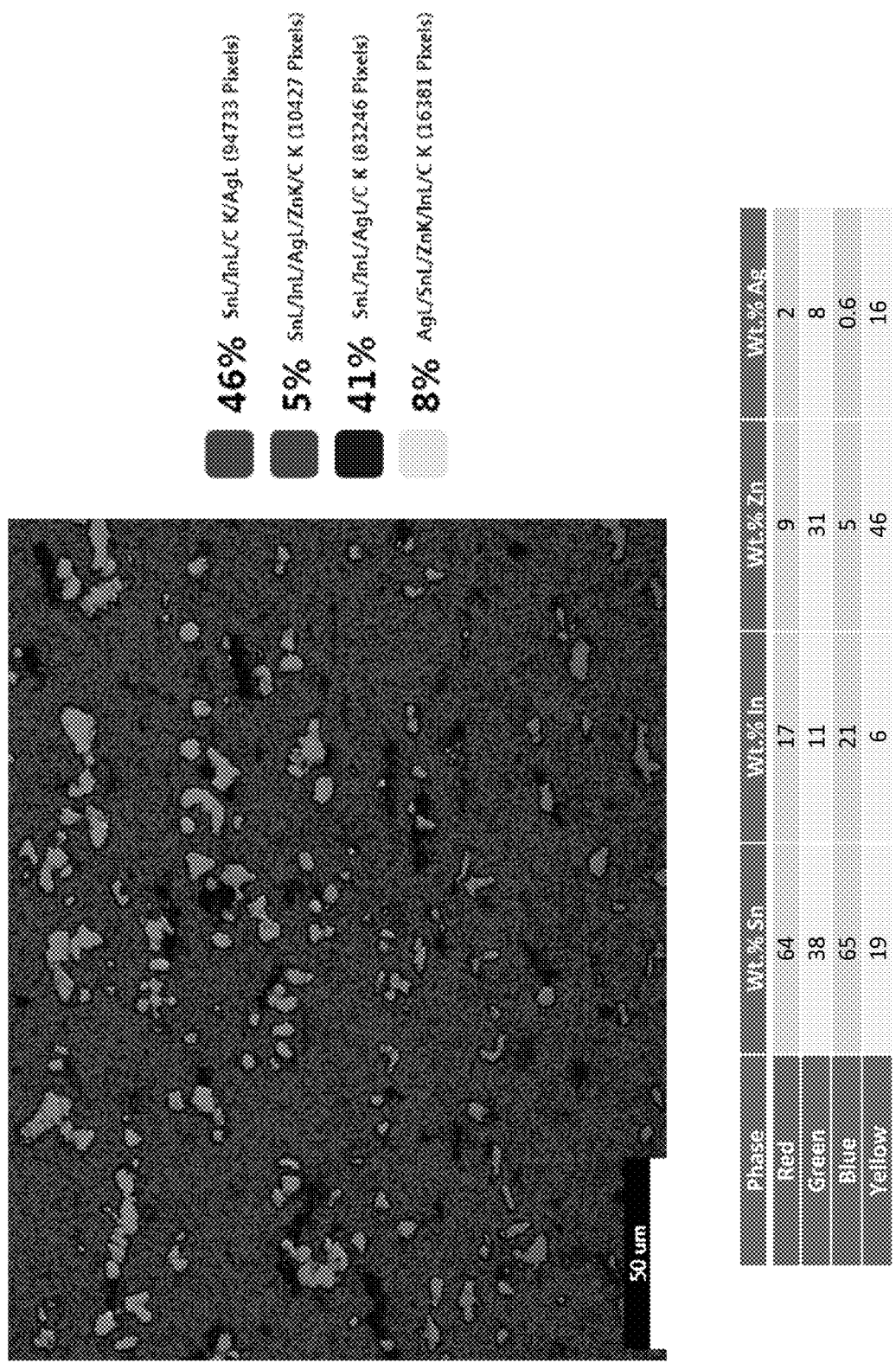

The following additional figures are referenced in Appendix A:

FIG. 10 is photomicrograph of a solder joint according to some embodiments;

FIG. 11 is photomicrograph of a solder joint according to some embodiments;

FIG. 12 is a is ternary phase diagram of tin, indium, and zinc overlaid with glass cracking test results according to some embodiments;

FIG. 13 is a graph of the number of glass cracks vs. indium alloys of a solder alloy on an electrical terminal for various power profiles according to some embodiments;

FIG. 14 is another graph of the number of glass cracks vs. indium alloys of a different solder alloy on a different electrical terminal for various power profiles according to some embodiments;

FIG. 15 is yet another graph of the number of glass cracks vs. indium alloys of a different solder alloy on a different electrical terminal according to some embodiments;

FIG. 16 is cross section view of an electrical connector soldered to a silver coated glass surface according to some embodiments;

FIG. 17 is a finite element analysis graph of a glass solder interface of an electrical terminal connected to a glass surface by a first solder alloy according to some embodiments;

FIG. 18 is a finite element analysis graph of a glass solder interface of an electrical terminal connected to a glass surface by a second solder alloy according to some embodiments;

FIG. 19 is a finite element analysis graph of a glass solder interface of an electrical terminal connected to a glass surface by a third solder alloy according to some embodiments;

FIG. 20 is a finite element analysis graph of a glass solder interface of an electrical terminal connected to a glass surface by a fourth solder alloy according to some embodiments;

FIGS. 21A-21D are elemental maps showing concentrations of silver, zinc, tin, and indium in a solder joint formed of a solder alloy according to some embodiments;

FIGS. 22A and 22B are optical micrographs and scanning electron micrographs of a solder joint formed of a first solder alloy according to some embodiments;

FIGS. 23A and 23B are optical micrographs and scanning electron micrographs of a solder joint formed of a second solder alloy according to some embodiments;

FIGS. 24A and 24B are optical micrographs and scanning electron micrographs of a solder joint formed of a third solder alloy according to some embodiments;

FIG. 25 is an elemental map of a solder joint formed of a first solder alloy according to some embodiments;

FIG. 26 is an elemental map of a solder joint formed of a second solder alloy according to some embodiments; and FIG. 27 is an elemental map of a solder joint formed of a first solder alloy according to some embodiments.

DETAILED DESCRIPTION OF THE INVENTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
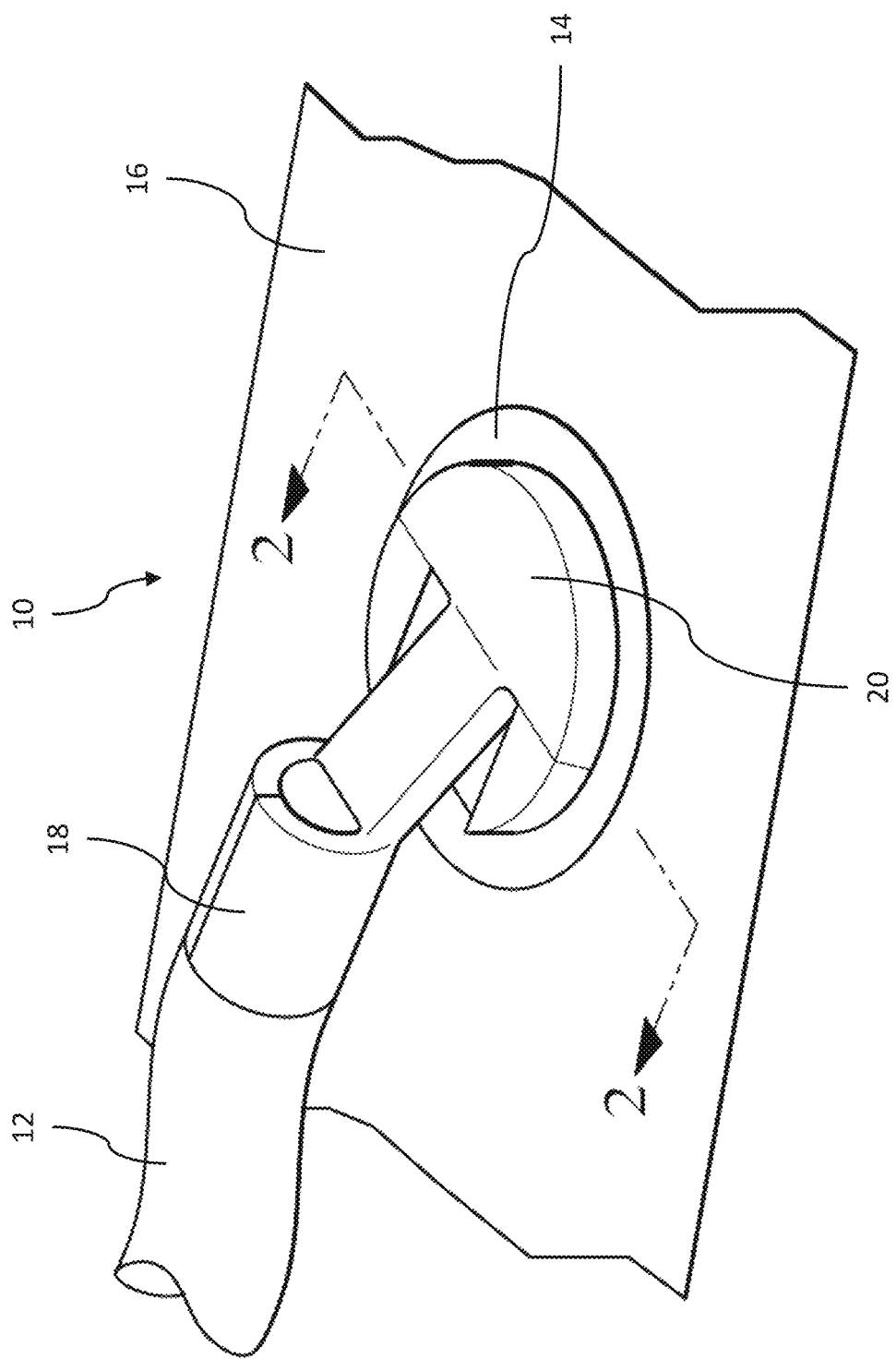
FIG. 1 illustrates an example of an electrically conductive connector designed according to some embodiments.
Figure 2:
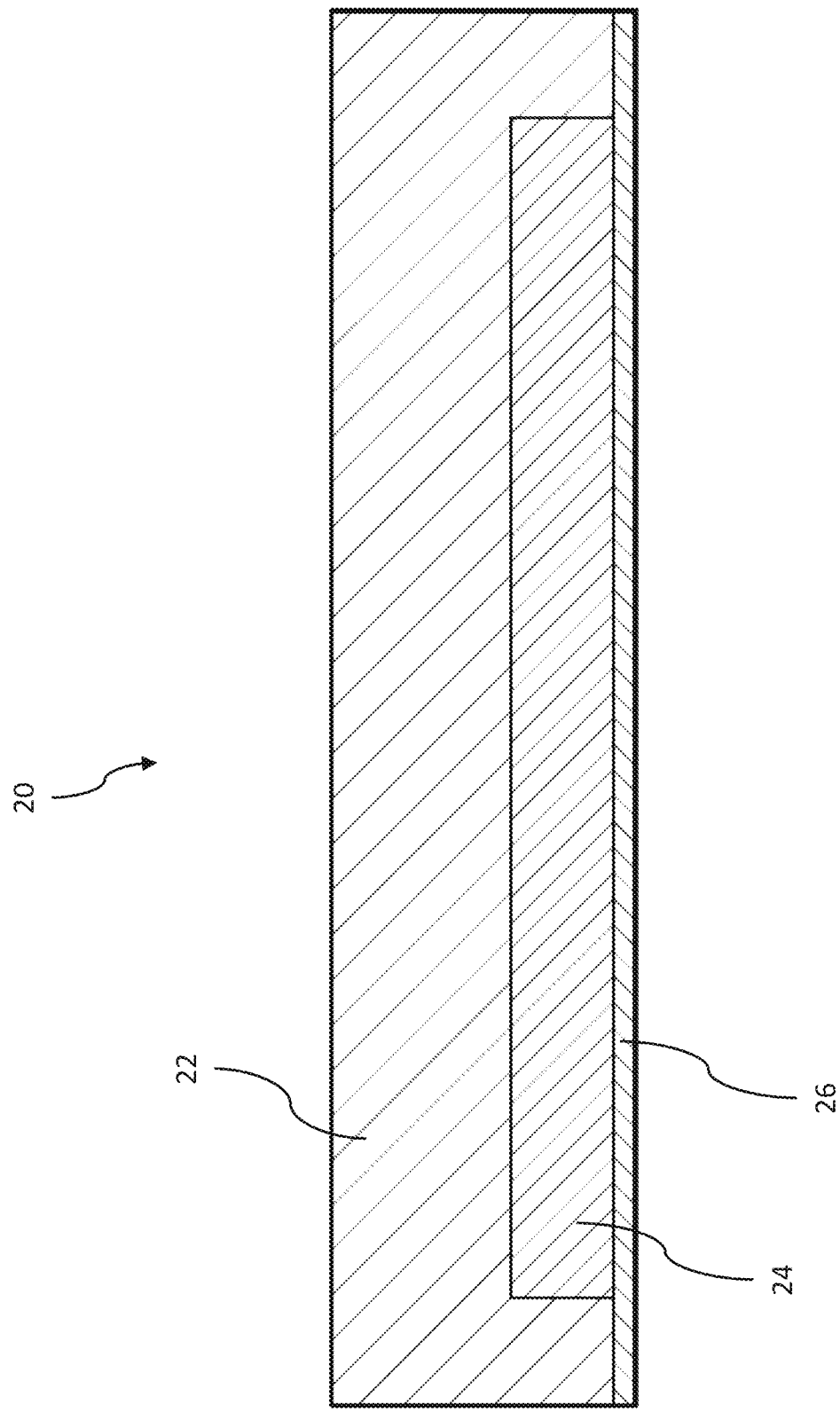
FIG. 2 is a cross section diagram schematically illustrating an arrangement of layers in the electrical connector taken along the lines 2-2 in FIG. 1 according to some embodiments.
Figure 3:
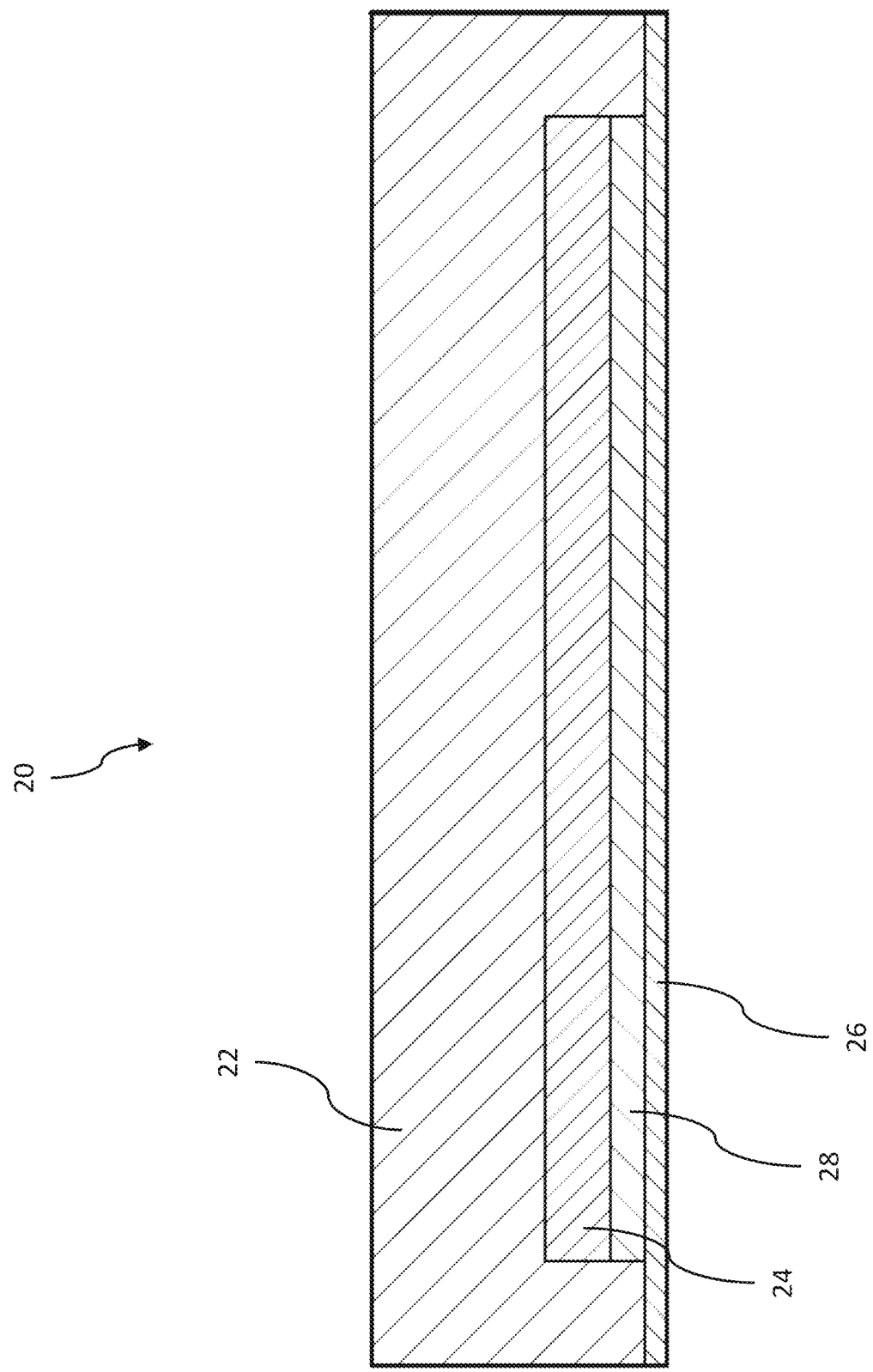
FIG. 3 is a cross section diagram schematically illustrating an arrangement of layers of another example electrically conductive connector designed according to some embodiments.

FIG. 1 illustrates an example of an electrical connector 10 that is adapted to make an electrical connection between a wire electrical cable 12 and a conductive contact pad 14 on a planar surface 16, such as a glass windshield or rear window of an automobile. This connector may be used to establish electrical connections from the vehicle's wiring system to circuits, such as heaters or antennae on the glass surface. The conductive contact pad 14 is typically silver-based. As shown in FIG. 1, the connector 10 has a wire attachment portion 18 that is crimped to the wire cable 12 and a planar contact portion 20. As shown in FIGS. 2 and 3, the contact portion 20 has at least two layers 22, 24 of electrically conductive material. The first layer 22, formed from, for example, a copper-based alloy has a coefficient of thermal expansion (CTE) that is greater than the CTE of the second layer 24, formed from, for example, an iron-nickel alloy. Two examples of suitable iron-nickel alloys are INVAR (typical composition 64% Fe, 36% Ni) or KOVAR (typical composition 54% Fe, 29% Ni, 17% Co). The difference between the coefficient of thermal expansion of the material forming the first layer 22 and the coefficient of thermal expansion of glass is greater than the difference between the coefficient of thermal expansion of the material forming the second layer 24 and the coefficient of thermal expansion of glass.

As shown in FIG. 2, a layer of a solder alloy 26 overlays at least a portion of the second layer 24 of the contact portion 20. The solder layer 26 is in direct and intimate contact with the second layer 24. As shown in FIG. 3, the contact portion 20 also includes a third layer 28 of material overlaying the second layer 24 and the solder layer may be in direct or intimate contact with a portion of the third layer 28 while still overlaying the second layer 24. This third layer 28 may be formed of a copper or tin based alloy and may improve the wetting of the solder to the contact portion 20. The third layer 28 may be clad with or plated on the second layer.

To prevent glass cracking caused by a difference in CTE between the contact portion 20 and the glass surface 16, a lower liquidus temperature is preferred. However, to meet the environmental requirements, a higher solidus temperature is needed to prevent failure of the solder joint between the contact portion 20 and the contact pad 14.

Figure 4:
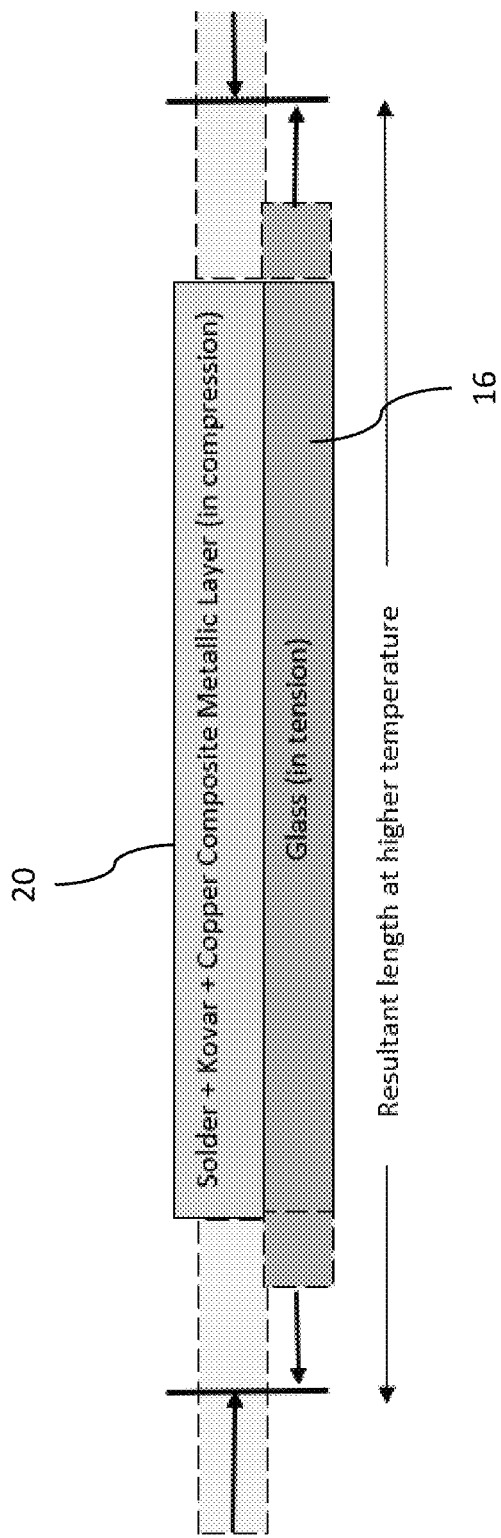
FIG. 4 is a schematic diagram of an electrical connector soldered to a silver coated glass surface illustrating stresses in the glass surface after soldering according to some embodiments.

FIG. 4 illustrates the nature of solder joints between the contact portion 20 and the glass surface 16 when CTE of glass is less than the CTE of the contact portion 20. Because of its lower CTE, the glass surface 16 should be stretched to the resultant length at high temperature and contact portion 20 should be compressed. Therefore, the glass surface 16 will be in tension and the contact portion 20 will be in compression. This will be an important consideration because the typical tensile strength for annealed glass is about 6,000 psi and the typical tensile strength for tempered glass 17,000 psi, whereas the compressive strength of both types of glass is about 150,000 psi.

Figure 5:
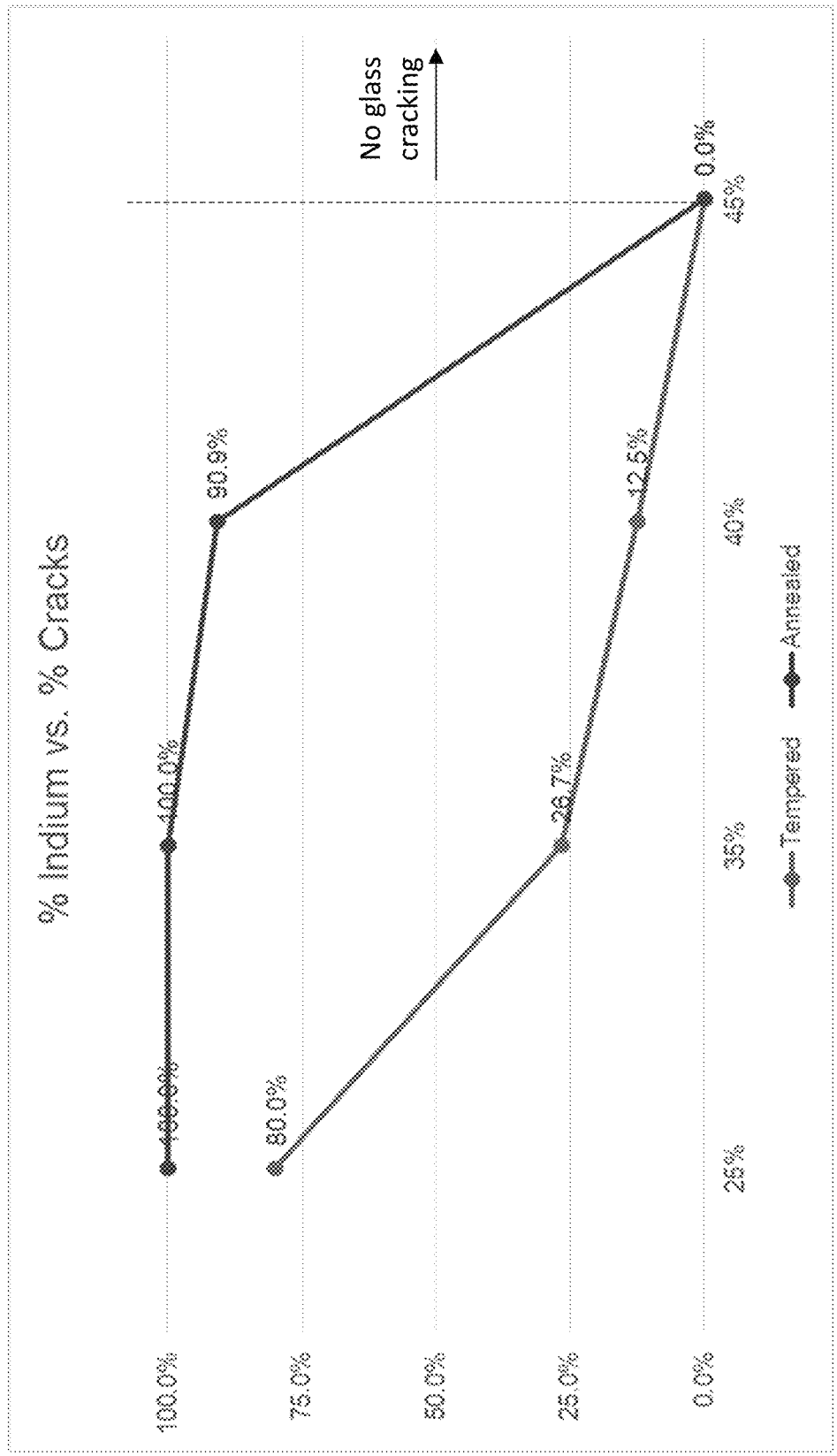
FIG. 5 is a graph of a percentage of glass samples with cracking vs. a percentage of indium in a solder alloy used to attach an electrical connector to the glass samples according to some embodiments.

Based on the graph of FIG. 5, it is evident that the percentage of cracked solder joints increased rapidly when the indium concentration of a tin-indium solder alloy is less than 45%. However, an indium content greater than 28% decreases the solidus temperature to 120° C., as evident in the indium-tin phase diagram of FIG. 6 and will lower the solder joint creep strength.

For automotive use, the electrical connector 10 must pass a test exposing the solder joint to a temperature of 140° C. with a 0.5 kg load applied, the solidus temperature should be greater than 155° C., assuming creep strength decreases rapidly at temperatures above 90% of the solidus temperature. A lower indium content (i.e., less than 42%) increases glass cracking propensity but increases creep strength even at indium concentration less than 28% as shown by the dotted lines in the indium-tin phase diagram of FIG. 7.

The layer of solder alloy 26 applied to the contact portion has a composition of about 15% to 28% indium by weight, about 5% to 20% zinc by weight, about 1% to 6% silver by weight, and about 36% to 79% tin by weight. As used herein, "about means±1% for concentrations less than or equal to 20% and ±3% for concentrations greater than 20%.

Figure 7:
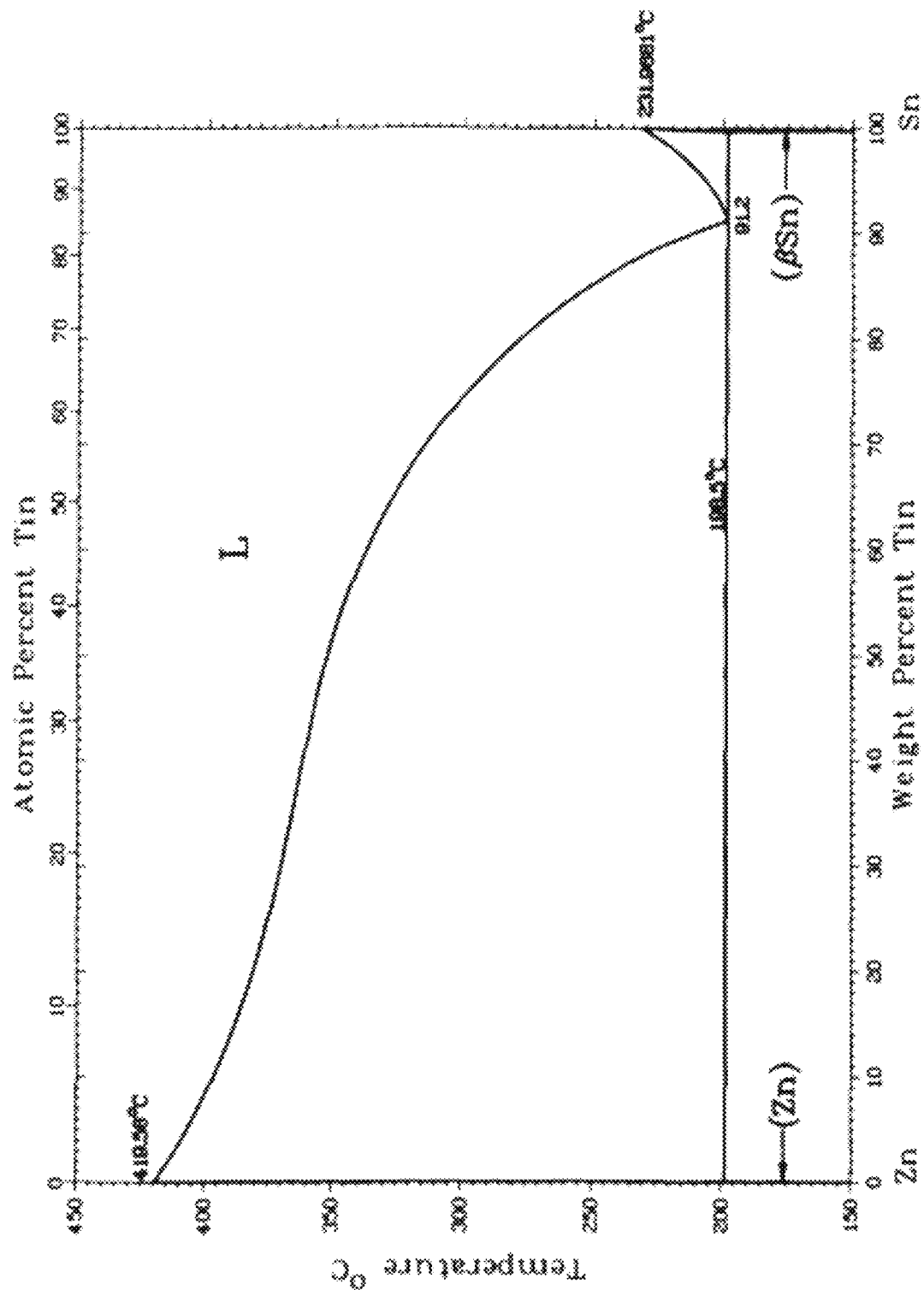
FIG. 7 is a binary phase diagram of zinc and tin according to some embodiments.
Figure 8:
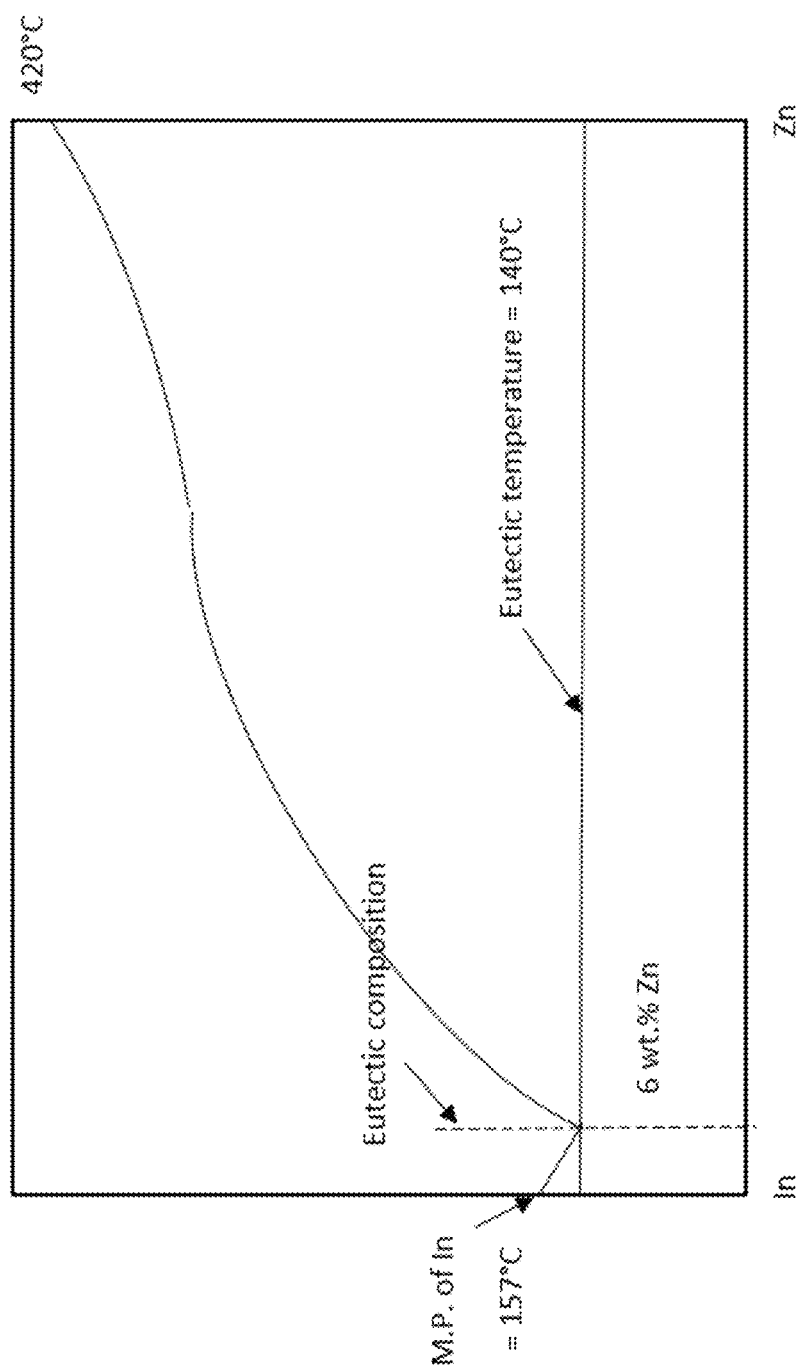
FIG. 8 is a binary phase diagram of indium and zinc according to some embodiments.
Figure 9:
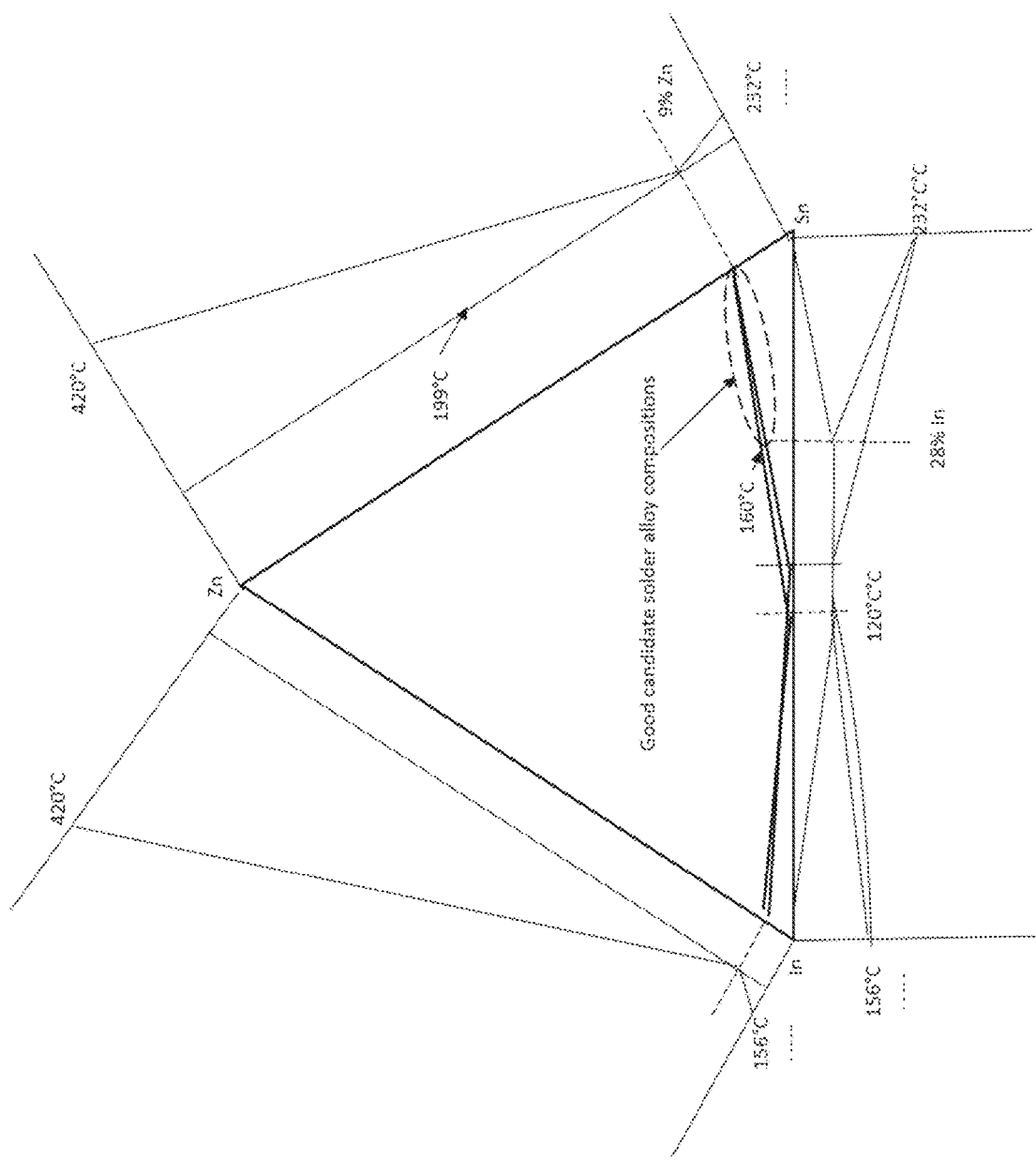
FIG. 9 is ternary phase diagram of tin, indium, and zinc showing a eutectic trough according to some embodiments.

Zinc forms eutectic alloys with both tin and indium as shown in FIGS. 7 and 8. Eutectic or near eutectic alloys are good candidates for soldering alloys. Approximate eutectic troughs in tin-indium-zinc ternary systems are shown in FIG. 9. Therefore, ternary tin-indium-zinc alloys with indium less than 28% and zinc about 5% to 20% zinc are determined to be good candidates for evaluation. A small amount of silver (about 1% to 6% by weight) is added to prevent silver migration from the contact pad on the glass to the solder alloy.

In several examples of the electrical connector 10, the second layer 24 has a thickness that is between 8% to 30% of the thickness of the contact portion 20. Electrical connectors 10 having a second layer thickness in a range of about 8% to 15% of the contact portion thickness and a solder layer containing about 24% indium by weight, about 9% zinc by weight, about 3% silver by weight, and about 64% tin by weight were able to pass a range of environmental exposure tests without causing glass cracking. Electrical connectors 10 having a second layer thickness of about 30% of the contact portion thickness and a solder layer containing about 24% indium by weight, about 9% zinc by weight, about 3% silver by weight, and about 64% tin by weight were able to pass a range of environmental exposure tests without causing glass cracking.

While the examples of the electrical connector 10 presented herein are directed to connecting wires to electrical contact pads on glass these are not limiting, and alternative embodiments may be envisioned having other uses and applications.

Accordingly, an electrical connector 10 and a solder alloy 26 is presented. The electrical connector 10 provides the benefit of providing an electrical connector between a wire cable 12 and contact pad 14 on a glass surface 16 while reducing or eliminating the incidence of glass cracking when soldering the connector 10 to the pad 14 while still meeting requirements to withstand exposure to temperatures up to 150° C. without failure of the solder joint. The solder alloy 26 has the additional benefit of lower cost by being a tin-based alloy rather than the more expensive indium-based alloy.

While preferred embodiments been described, this disclosure is not intended to be so limited, but rather only to the extent set forth in the claims that follow. For example, the above-described embodiments (and/or aspects thereof) may be used in combination with each other. In addition, many modifications may be made to configure a situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

APPENDIX A—DEVELOPMENT REPORT

1. Purpose

This study focuses on development of a low percentage indium solder to be used in conjunction with a KOVAR-copper clad base material for soldering to silver fired on tempered automotive glass. Many solder alloys were made and evaluated using the primary criteria of temperature cycling to evaluate glass cracking and high temperature exposure to evaluate the temperature at which the joint fails under mechanical load.

2. Development Approach

The development approach was to focus on modifying the binary indium-tin system. Previous solder development indicated that a lower indium content, i.e., less than 42% by wt., caused glass cracking, as indicated in FIG. 5.

It is evident that the percentage of cracked solder joints increased rapidly with the indium concentration being less than 45%. However, indium content greater than 28% decreased the solidus temperature to 120° C., as evident in the indium-tin phase diagram of FIG. 6. This will lower the solder joint creep strength.

For solder joints to pass a load test at 140° C., the solidus temperature may be greater than 155° C., assuming creep strength decreases rapidly above 90% of the solidus temperature. A lower indium content (i.e., less than 42%) increases glass cracking propensity but increases creep strength even at indium concentration less than 28% as shown by the dotted lines in the indium-tin phase diagram of FIG. 7. There is no overlapping range of indium and tin where both the creep strength and glass cracking criteria of a binary indium-tin alloy are satisfied.

To satisfy the criterion of creep strength, the solidus temperature of a solder alloy should be greater than 140° C. This can be determined by Digital Scanning calorimetry (DSC) and approximated from phase diagrams, either published or constructed.

Glass cracking criterion is difficult to predict. It depends on both physical (CTE) and mechanical [elastic modulus, percentage of elongation, yield strength (YS) and ultimate tensile strength (UTS) properties of both the solder and the glass. There is little reliable published data to analyze or determine the stress in the glass. Therefore, alloy development was guided by the functional test of temperature cycling of soldered joints and determine percentage of cracked joints. An attempt was made to perform a finite element analysis (FEA), discussed later.

For a preliminary evaluation potential additive to indium-tin system, Mohr's hardness values of several elements were evaluated as shown in Table 1 below.

TABLE 1

| Elements | In | Sn | Zn | Ag | Bi | Al | Cu | Sb | Ni | Fe |
|---|---|---|---|---|---|---|---|---|---|---|
| Mohr's hardness | 1.2 | 1.5 | 2.5 | 2.5 | 2.5 | 2.75 | 3 | 3 | 4 | 4.5 |

Hardness is affected by both elastic modulus and UTS. To minimize stress in the glass, it is necessary to select elements with low hardness values which excludes indium and tin. The next candidate elements are zinc, silver, and bismuth. Silver and bismuth are both relatively expensive metals. Therefore, zinc was selected as a candidate alloying element to the indium-tin system.

Fortunately, zinc forms eutectic alloys with both tin and indium as shown in FIGS. 7 and 8.

An approximate liquidus surface of the ternary tin-indium-zinc can be constructed to identify near eutectic alloys. Eutectic or near eutectic alloys are good candidates for soldering alloys. Approximate eutectic troughs in tin-indium-zinc ternary systems are shown in FIG. 9.

Therefore, ternary tin-indium-zinc alloys with indium less than 28% and zinc around 9% are determined to be good candidates for evaluation.

3. Evaluation Methods

Temperature cycling to evaluate glass cracking: −40° C. to +90° C., increasing 1° C. per minute for 30 cycles.

Creep test: suspend 0.5 kg weight from terminal soldered to glass, hold at starting temperature for 24 hours, increasing temperature by 5° C. every 24 hours until failure.

DSC to determine liquidus and solidus temperature.

Scanning Electron Microscopy (SEM) and elemental mapping for microstructure analysis.

Inductively Coupled Plasma (ICP) and X-ray scanning of solder alloy.

Finite Element Analysis (FEA) modeling to estimate stress in the glass.

Corrosion testing; exposure to saltwater vapor at 80° C. for 72 hours.

Tensile testing.

Destructive tests pulling terminal off glass.

Soldering power level evaluation.

Determining coefficient of thermal expansion (CTE).

4. Preliminary Results—Alloy Evaluation

Two to four-pound samples of tin-indium-zinc alloys with indium percentages between 25% and 45% with three percent silver and the balance tin were melted, cold rolled to sheet stock which was used to prepare experimental samples.

Figure 6:
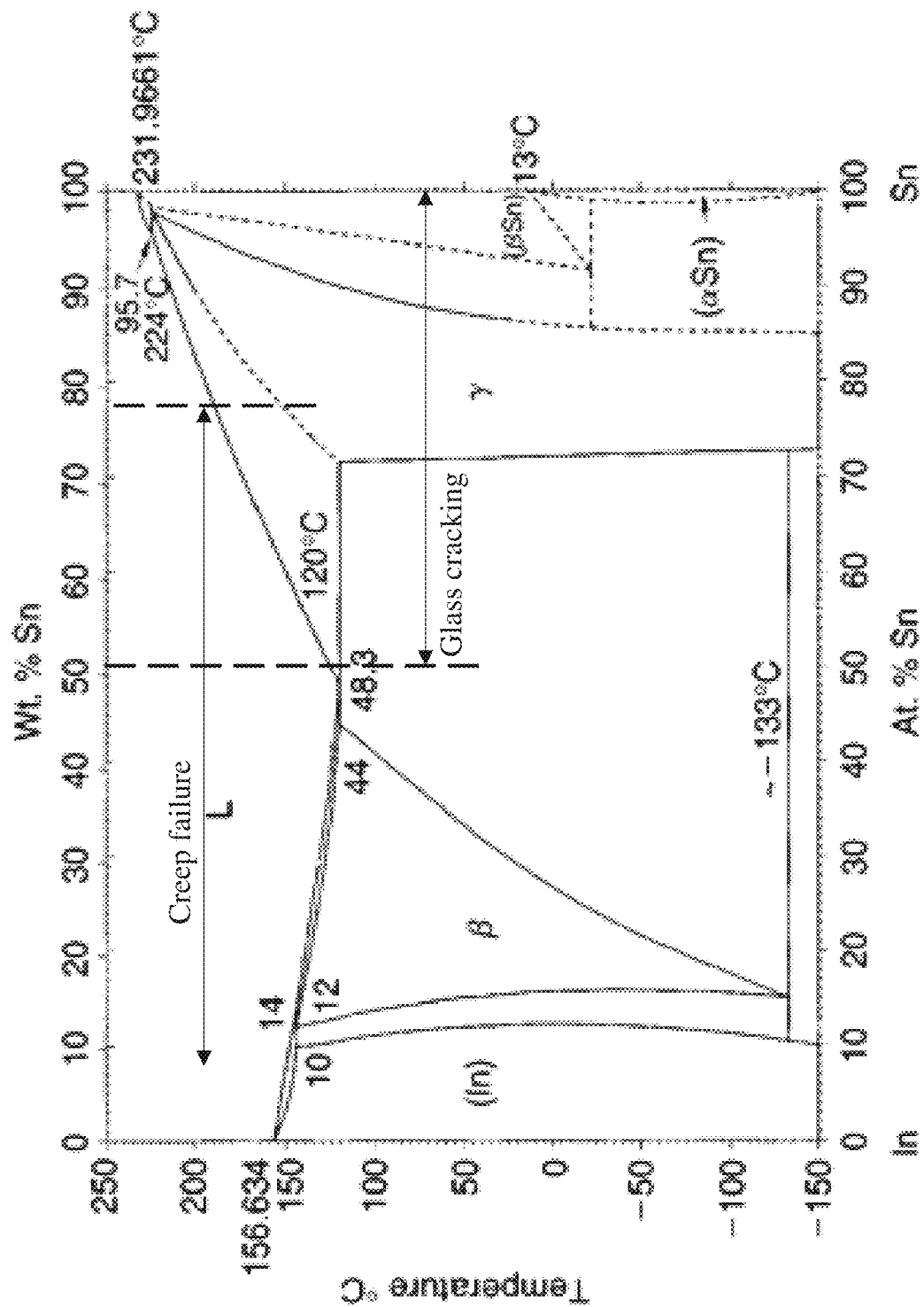
FIG. 6 an indium-tin phase diagram according to some embodiments.

Square shaped soldering pieces were fabricated and soldered to glass using a copper KOVAR base material with 0.009" thick KOVAR layer. Using the temperature cycle method for evaluating glass cracks, the minimum amount of indium to prevent glass cracks is 45%, which partially melts at a eutectic temperature of 120° C. as shown in FIG. 6 which is too low to pass an automotive standard for high temperature creep test. To avoid this eutectic melting component, the indium content of candidate tin-indium-zinc alloys was selected be less than 28% wt., as shown in FIG. 9.

DSC traces were generated to determine liquidus and solidus temperatures and to verify whether the liquidus temperature is greater than 120° C.

Number of cracks for 100 solder joints, load or creep test at elevated temperature and liquidus/solidus temperatures for a number tin-In-zinc alloys with less than 28% wt. indium and 0-12% wt. zinc on a two-foot square pad terminal with 0.0095" KOVAR and copper solder interface are shown in Table 2 below. A small amount of silver (about 3% by weight) was added to prevent silver migration from the contact pad on the glass to the solder.

TABLE 2

| Sn % | In % | Zn % | Ag % | Cracks | Creep Temp | Liquidus Temp | Solidus Temp |
| --- | --- | --- | --- | --- | --- | --- | --- |
| 68 | 17 | 12 | 3 | 1 | 145° C. | 182° C. | 152° C. |
| 67 | 18 | 12 | 3 | 0 | 140° C. | 176° C. | 151.5° C. |

The 0.009" KOVAR and a copper solder interface provides the lowest terminal CTE which allows for a lower percentage of indium to prevent cracking and copper as the best solder interface for wettability to provide resistance to higher temperature before failure. Zero cracks formed with 67% tin, 18% indium, 12% zinc, 3% silver and the creep test with 0.5 kg weight survived temperatures up to 140° C. before failure. FIG. 10 shows a micrograph of the copper solder interface after high temperature and saltwater vapor exposure. Interface is good with no evidence of corrosion. Separation of the copper/solder interface is due to cutting during sample preparation.

TABLE 3

| Sn % | In % | Zn % | Ag % | Cracks | Liquidus Temp | Solidus Temp |
| --- | --- | --- | --- | --- | --- | --- |
| 72 | 20 | 5 | 3 | 8 | | |
| 69 | 19 | 9 | 3 | 13 | | |
| 68 | 20 | 9 | 3 | 4 | | |

TABLE 3-continued

| Sn % | In % | Zn % | Ag % | Cracks | Liquidus Temp | Solidus Temp |
| --- | --- | --- | --- | --- | --- | --- |
| 66 | 22 | 9 | 3 | 2 | | |
| 68 | 17 | 12 | 3 | 2 | 178° C. | 150° C. |
| 67 | 18 | 12 | 3 | 2 | 176° C. | 151.5° C. |
| 66 | 19 | 12 | 3 | 0 | 173.5° C. | 148° C. |
| 65 | 20 | 12 | 3 | 1 | 172° C. | 145° C. |
| 64 | 21 | 12 | 3 | 1 | 170.5° C. | 140° C. |

Table 3 shows results of a two-foot round pad terminal with 0.0095" KOVAR inlay (KOVAR/solder interface) which resulted in more failures in the creep test due to the poor bond between the KOVAR and the solder. FIG. 11 shows a cross section micrograph of the solder joint after exposure to elevated temperature and saltwater vapor. Voids indicate poor wettability and corrosion after exposure. Zero cracks formed with 69% tin, 19 in, 12% zinc, 3% silver and results below indicate it passes a modified creep test revised to start at 115° C. and increase the temperature 5° C. every 24 hours until failure.

TABLE 4

| Sn % | In % | Zn % | Ag % | Cracks | Creep Temp | Liquidus Temp | Solidus Temp |
| --- | --- | --- | --- | --- | --- | --- | --- |
| 68 | 17 | 12 | 3 | 9 | | 182° C. | 152° C. |
| 67 | 18 | 12 | 3 | 4 | | 176° C. | 167° C. |
| 69 | 19 | 9 | 3 | 24 | | 183° C. | 148° C. |
| 68 | 20 | 9 | 3 | 7 | | 173° C. | 145° C. |
| 66 | 22 | 9 | 3 | 6 | | 171° C. | 153° C. |
| 66 | 19 | 12 | 3 | 5 | | 173.5° C. | 148° C. |
| 65 | 20 | 12 | 3 | 10 | | 172° C. | 145° C. |
| 64 | 21 | 12 | 3 | 9 | | 170.5° C. | 140° C. |
| 66 | 22 | 9 | 3 | 6 | | 171° C. | 153° C. |
| 64 | 24 | 9 | 3 | 0 | 125° C. | 172° C. | 144° C. |

Table 4 shows the results of a two-foot round pad terminal with 0.0045" KOVAR inlay and KOVAR/solder interface. The thinner KOVAR of Table 4 has a higher CTE when clad with the copper which requires a higher percentage of indium to lower the number of cracks. The KOVAR/solder interface also resulted in creep test failures due to the poor bond between the solder and the KOVAR. Shown below in micrographs after exposure to elevated temperatures and saltwater vapor. Alloy 64% tin, 24% indium, 9% zinc, 3% silver resulted in zero cracks.

TABLE 5

| Sn % | In % | Zn % | Ag % | Cracks | Creep Temp | Liquidus Temp | Solidus Temp |
| --- | --- | --- | --- | --- | --- | --- | --- |
| 64 | 24 | 9 | 3 | 2 | 125° C. | 172° C. | 144° C. |

Table 5 shows the results of a two-foot round pad terminal with 0.0025" KOVAR inlay with a KOVAR/solder interface. Table 5 further indicates that the thinner the KOVAR layer is, the higher the CTE is and therefore more indium is required to prevent glass cracks. The 0.0025" KOVAR inlay with the KOVAR/solder interface presents the same problems with low creep test results as indicated in Table 4 above.

TABLE 6

| Copper Plate Temp | #1 | #2 | #3 | #4 | Tin Plate Temp | #1 | #2 | #3 | #4 |
|---|---|---|---|---|---|---|---|---|---|
| 120° C. | Pass | Pass | Pass | Pass | 120° C. | Pass | Pass | Pass | Pass |
| 125° C. | Pass | Pass | Pass | Pass | 125° C. | Pass | Pass | Pass | Pass |
| 130° C. | Pass | Pass | Pass | Pass | 130° C. | Pass | Pass | Pass | Pass |
| 135° C. | Pass | Pass | Pass | Pass | 135° C. | Pass | Pass | Pass | Pass |
| 140° C. | Pass | Pass | Pass | Pass | 140° C. | Pass | Pass | Pass | Pass |
| 145° C. | Pass | Pass | Pass | Pass | 145° C. | Pass | Pass | Pass | Pass |
| 150° C. | Pass | Pass | Pass | Pass | 150° C. | Pass | Pass | Pass | Pass |

Table 6 shows the results for a two-foot round pad terminal with 0.0045" KOVAR inlay overall copper plated having a copper plated KOVAR/solder interface and a two-foot round pad terminal with 0.0045" KOVAR inlay overall tin plated having a tin plated KOVAR/solder interface with a colder alloy of 65% tin, 20% indium, 12% zinc, and 3% silver.

The tin and copper plated surfaces of the KOVAR in Table 6 provide better wettability to the solder and survive higher temperature before failure in the high temperature exposure test. The KOVAR/solder interface may be made with copper or tin plated KOVAR or a copper or tin skin clad to the KOVAR during bonding.

Series 7. Single pad round terminals with two levels of indium and two levels of zinc and a copper skin solder interface 0.009" KOVAR.

TABLE 7

| Sn % | In % | Zn % | Ag % | # samples | Cracks |
|---|---|---|---|---|---|
| 69 | 19 | 9 | 3 | 14 | 5 |
| 66 | 19 | 12 | 3 | 16 | 1 |
| 68 | 20 | 9 | 3 | 14 | 3 |
| 65 | 20 | 12 | 3 | 16 | 0 |

Table 7 shows the results for single pad round terminals with two levels of indium and two levels of zinc and a copper skin solder interface 0.009" KOVAR. With the best solder interface and the optimum KOVAR thickness of Table 7, the best solder alloy is 65% tin, 20% indium, 12% zinc, 3% silver which provides no glass cracks.

Series 8. Two-foot round bridge terminals with copper plated and tin plated KOVAR surface for plated KOVAR/solder interface. High temperature (Creep) Test

TABLE 8

| Sn % | In % | Zn % | Ag % | Cracks |
|---|---|---|---|---|
| 69 | 19 | 9 | 3 | 0 |
| 66 | 19 | 12 | 3 | 0 |
| 68 | 20 | 9 | 3 | 0 |
| 65 | 20 | 12 | 3 | 0 |

Important Observations:
With the best solder interface and the optimum KOVAR thickness the best solder alloy is 65% tin, 20% indium, 12% zinc, 3% silver with no glass cracks
Alloy 70% tin-18% indium-12% zinc-3% silver and 69% tin, 19% indium, 12% zinc, 3% silver are promising having passed crack test with thicker KOVAR.
All other alloys passed either cracking or creep test, not both.
The KOVAR layer may be plated with copper or tin or clad with a thin layer of copper during bonding to pass the high temperature exposure test with 0.5 kg weight.

Additional testing may be done with thinner layers of KOVAR to determine the optimum levels of indium and zinc Glass cracking phenomenon is very difficult to predict as it depends on many different factors. It appears that to avoid glass cracking, an indium concentration greater than 18% may be utilized. For zinc, the range is 5%-12%. The addition of zinc greatly reduced the propensity of glass cracking. However, higher zinc cause problems with dross resulting from oxidation of zinc during melting. Presence of elemental zinc (none found in SEM analysis) could also result in galvanic corrosion of the solder joint. Therefore, zinc content may be in the lower end of the range. Several alloys were evaluated at 12% and 9% zinc. A few more alloys at 5% zinc may be evaluated.

For indium less than 18%, alloys failed the glass cracking test but passed the creep test as solidus increased with lower In. The creep test performed at 130° C. was found to be too severe. The creep test protocol was changed to incremental temperature increases of 5° C. every 24 hours starting at 115° C. and continuing until failure. The objective of the new protocol was to identify candidate alloys which would pass both the tests. Several alloys were found with 17-24% indium and 9-12% zinc.

Observation of failures during the creep test evaluation showed the base material surface was significant factor in early failures. Samples with the copper base material surface performed much better. Samples with KOVAR base material surface resulted in failures as low as 115° C. on alloys with higher liquidus and solidus temperatures.

Additional testing with tin plated KOVAR and copper plated KOVAR surfaces were evaluated. Both copper and tin plated KOVAR surfaces greatly improved performance in the high temperature test with 0.5 kg weight. Copper and tin plating surfaces tested with the 65% tin, 20% indium, 12% zinc, 3% silver alloy from 120 C to 150 C with the 0.5 kg weight for 24 hours at each temperature passed up to 150° C. which is the highest temperature at which the test was run.

Micrographs of the KOVAR/solder interface after salt/humidity exposure showed voids. Micrographs of the KOVAR with copper/solder interface showed no voids or corrosion.

This demonstrates that the base material may have a copper clad surface, tin plated, or copper plated soldering surface.

High temperature exposure test has been reevaluated for alloy 65% tin, 20% indium, 12% zinc, 3% silver and plating of the KOVAR layer. Results are in Table 6 above.

5. Further Alloy Optimization—Effects of KOVAR Thickness and Soldering Power Level Connector cost increases with KOVAR thickness and therefore thickness of the KOVAR layer may be minimized. However, reduced KOVAR thickness increases CTE mismatch as shown in Table 9. Reduced KOVAR thickness may require higher indium content solder alloy to mitigate stresses in the glass. Thus, there may be a cost trade-off between solder alloy indium content and KOVAR thickness.

TABLE 9

CTE of KOVAR inlay and other components

| Solder Joint Components | CTE, $10^{-6}$/° C. |
|---|---|
| 8% or 0.0022" KOVAR | 15.8 ± 0.7 |
| 15% or 0.0045" KOVAR | 13.6 ± 0.6 |
| 30% or 0.009" KOVAR | 10.3 ± 0.6 |

TABLE 9-continued

CTE of KOVAR inlay and other components

| | |
|---|---|
| Copper | 16.7 |
| Soda lime glass | 8.9 |

Effect of Soldering Power Level

To reduce cost, it is desirable to minimize the thickness of KOVAR. FIG. 13 shows glass cracking propensity (number of cracks) with varying percentage of indium in tin-indium-12% zinc-3% silver alloys for 0.0045" KOVAR layer at different soldering power levels. With this limited data base, it is evident that the lowest power level 600 Watt-sec is the best for minimizing crack formation. At 21 wt. % indium, cracks were eliminated for 600 Watt-sec; whereas, at higher power levels 700 Watt-sec and 800 Watt-sec., the number of cracks increased. There was quite a bit of scatter in the data. The tests may be repeated with a larger number of samples.

Candidate alloys were selected for all three thickness of KOVAR in the copper base material (0.009" 0.0045" 0.0025"). Candidate alloys were selected for all the three KOVAR thicknesses.

- 65% tin, 20% indium, 12% zinc, 3% silver was selected as the candidate alloy for 0.009" KOVAR base material
- 64% tin, 24% indium, 9% zinc 3% silver was selected as the candidate alloy for 0.0045" and 0.0025" KOVAR base material 6. Tensile Testing of Low Indium Alloys Dog-bone shape flat samples were prepared from several alloys for tensile testing using ASTM. The objective is to determine typical Modulus, % Elongation, Yield Stress (Y.S.) and Ultimate Tensile Stress (UTS). All the mechanical properties will be useful to determine solder joint stresses and failure in the solder layer. Table 10 illustrates mechanical properties of several low indium solder alloys along with production alloys and several experimental alloys published in the literature.

TABLE 10

Results of Tensile Tests

| Alloy | Young's Modulus, $\times 10^3$ ksi | UTS, ksi | 0.2% YS, ksi | % Elongation | Specimen Comments |
|---|---|---|---|---|---|
| 7% Sn-0% In-3% Ag* | 0.3 | 1.01 | 0.68 | 53.5 | Mid of gage length |
| 65-3* | 0.3 | 1.69 | 1.0 | 59.0 | Mid of gage length |
| A: 70% Sn-18In-9% Zn-3Ag* | 5.68 | 7.2 | 5.46 | 5.7 | Mid ½ radius |
| B: 68% Sn-20In-9% Zn-3Ag* | 4.16 | 7.65 | 5.23 | 5.3 | Mid ½ to Mid-radius |
| C: 68% Sn-17In-12% Zn-3Ag* | 3.57 | 7.2 | 5.83 | 4.5 | Mid ½ to Mid-radius |
| Pb** | 2.61 | 1.74 | — | 55 | |
| Pb-Sn Eutectic (62% Sn)** | 4.57 | 7.8 | — | 37 | |
| Sn-3.5 Ag** | 6.5 | 3.9 | 3.2 | 24 | |
| Sn-2.5% Ag-0.8Cu-0.5Sb** | 7.4 | 5.7 | 4.9 | 50 | |

*Experimental Results
**From published literature

Mechanical properties of low indium tin-indium-zinc-3% silver alloys are quite different from high indium B604 which has a much lower elastic modulus and higher percentage elongation. Yet, there are several low indium tin-indium-zinc-3% silver alloys that passed the glass cracking test. A discussion of how key parameters like (i) modulus (ii) CTE (iii) thickness of various layers affect the stress in the glass and the type of stress, whether it is compressive and tensile is contained in Section 7.

The low percentage of elongation could be related to sample preparation. None of the recent samples failed within the gage length and failed at the radius. The tests will be repeated with better surface finish and edges deburred.

7. Solder Joint Stress Analysis Using Finite Element Analysis (FEA)

FIG. 16 illustrates the nature of solder joints consisting of the glass and composite metallic layer when CTE of glass is less than CTE of the composite metallic layer. Because of lower CTE, glass sheet is stretched to the resultant length at high temperature and the composite metallic layer may be compressed. Therefore, the lower CTE layer will be in tension and the higher CTE layer in compression. This will be an important consideration as typical tensile strength is about 6,000 psi for annealed and 17,000 psi for tempered glass, whereas compressive strength is about 150,000 psi.

The objective is to reduce tensile stresses in the glass. A more desirable solution is to induce compressive stress in the glass.

Following cases illustrate a simple sensitivity study by varying CTE and modulus of the solder alloys. The modulus values were determined from the tensile testing.

TABLE 11

7% Sn-90% In-3% Ag Solder

| Material | CTE, ppm/° C. | Modulus, ×10 psi | Thickness, in | Max tensile stress psi |
|---|---|---|---|---|
| Copper | 16 | 1.6 | 0.02 | 2,389 |
| Glass | 9 | 1.0 | 0.04 | |
| KOVAR, 0.009" | 10 | 2.0 | 0.009 | |
| 7% Sn-90% In-3% Ag Solder | 29 | 0.03 | 0.006 | |

Stress distribution through the glass thickness for Case 1 is shown in FIG. 17. The maximum tensile stress, 2,389 psi, in the glass is at the glass/solder interface as indicated by red. The stress distribution for Cases 2-4 below are shown in FIGS. 18-20.

Case 2—68% tin, 17% indium, 12% zinc, 3% silver; Same CTE as 7% Sn-90% In-3% Ag solder

| Material | CTE, ppm/° C. | Modulus, ×10 psi | Thickness, in | Max tensile stress psi |
|---|---|---|---|---|
| Copper | 16 | 1.6 | 0.02 | 3,384 |
| Glass | 9 | 1.0 | 0.04 | 41% |
| KOVAR, 0.009" | 10 | 2.0 | 0.009 | increase |
| 68% Sn-17% In-12% Zn-3% Ag | 29 | 0.35 10× increase | 0.006 | |

Case 3—68% tin, 17% indium, 12% zinc, 3% silver; CTE 30% lower than 7% Sn-90% In-3% Ag solder

| Material | CTE, ppm/° C. | Modulus, ×10 psi | Thickness, in | Max tensile stress psi |
|---|---|---|---|---|
| Copper | 16 | 1.6 | 0.02 | 3,197 |
| Glass | 9 | 1.0 | 0.04 | 33% increase |
| KOVAR, 0.009" | 10 | 2.0 | 0.009 | |
| 68% Sn-17% In-12% Zn-3% Ag | 20 33% decrease | 0.35 10× increase | 0.006 | |

Case 4: 70% tin, 18% indium, 9% zinc, 3% silver; Modulus 20× higher than 7% Sn-90% In-3% Ag solder

| Material | CTE, ppm/° C. | Modulus, ×10 psi | Thickness, in | Max tensile stress psi |
|---|---|---|---|---|
| Copper | 16 | 1.6 | 0.02 | 3,711 |
| Glass | 9 | 1.0 | 0.04 | 55% increase |
| KOVAR 0.009" | 10 | 2.0 | 0.009 | |
| 70% Sn-18% In-9% Zn-3% Ag | 29 | 0.65 20× increase | 0.006 | |

Summary Table

| Solder Alloy | CTE, % Change | Modulus, % change | Tensile stress % Change |
|---|---|---|---|
| B6-04 | 0 | 0 | 0 |
| 68% Sn-17% In-12% Zn-3% Ag | 0 | 10× increase | 41% increase |
| 68% Sn-17% In-12% Zn-3% Ag | 33% decrease | 10× increase | 33% increase |
| 70% Sn-17% In-9% Zn-3% Ag | 0 | 20× increase | 55% increase |

The new low indium alloys have much higher (10×-20×) moduli compared to that of 7% Sn-90% In-3% Ag solder which result in 41-55% increase in tensile stress in the glass at the glass/solder interface.

Assuming one of the new alloys has a 33% lower CTE compared to that of 7% Sn-90% In-3% Ag solder, increase in tensile stress is 33%. Therefore, a decrease in CTE has a more dominant effect than an increase in modulus.

Typical tensile strength of glass is about 6,000 psi for annealed and 17,000 psi for tempered glass, whereas compressive strength is about 150,000 psi.

It is important to note that for all the above cases except 4, the FEA predicted stresses are about 50% of the tensile strength of annealed glass (6000 psi).

Measurement of CTE values of candidate low indium alloys may determine whether solder CTE could be further decreased to reduce tensile stress or even make compressive.

8. Corrosion Test of Soldered Joints

Zinc is generally used as a sacrificial element for galvanic corrosion. Therefore, it is necessary to investigate whether zinc is present as elemental zinc and there is corrosion at the solder copper interface. Accelerated corrosion tests were performed for 24 and 72 hours at 80° C. in a 5% salt (NaCl) water solution vapor.

Two copper coupons were soldered together, and the soldered pieces were exposed to saltwater vapor in beakers placed in an oven maintained at 80° C.

The 72 hr. exposed samples were sectioned to examine the copper/solder interface for corrosion of the zinc containing solder alloy layer. The soldered joint microstructure is shown in FIG. 10. The copper/solder interface remained intact. The delamination at the edge was caused during shearing for metallographic sample preparation.

Distribution of zinc in the soldered joint was examined by X-ray elemental mapping using scanning electron microscopy (SEM) as shown in FIGS. 21A-21D.

The bright areas in the microstructure indicate the presence of the element in its elemental map. For example, bright areas in the silver map of FIG. 21A indicate the presence of silver in the globular phases. Coincidentally, zinc is also present in the silver globular phases and nowhere else as elemental zinc. Therefore, zinc in the solder is present as a silver-zinc alloy which may be much more noble than elemental zinc.

9. Effect of Zinc on Tin-Indium-Zinc-Silver Solder Microstructure

Mechanical and physical properties of alloys are controlled by the volume fraction and characteristics of individual phases in the microstructure and not by the overall alloy. The effect of zinc addition to indium-tin alloys was significant in reducing or eliminating cracks in the glass during temperature cycling. The objective is to combine microstructural characteristics and FEA stress analysis to predict propensity of glass cracking in the same way as DSC data predict creep strength. Following are optical and SEM of three alloys with three levels of zinc, i.e., 5%, 9% and 12%. The 5% zinc alloy is shown in FIGS. 22A-B which show a fine eutectic matrix of two phases and a lower atomic number globular phase in FIG. 22B. The 9% zinc alloy is shown in FIGS. 23A-B which show a fine eutectic matrix of two phases, a lower atomic number globular phase (dark areas), and a higher atomic number globular phase (light gray areas). The 12% zinc alloy is shown in FIGS. 24A-B which show a fine eutectic matrix of two phases, a lower atomic number finer globular phase (dark areas), and a higher atomic number globular phase in FIG. 24B.

FIG. 25 shows a SEM Elemental Map of the 70% tin, 20% indium, 5% zin, 5% silver alloy. Most of zinc is present as an alloy with silver (13 vol %). Majority is a eutectic mixture of the red phase (30 vol %), the green phase (36 vol %), and the blue phase (20 vol %).

FIG. 26 shows a SEM Elemental Map of the 68% tin, 20% indium, 9% zinc, 3% silver alloy. Most of zinc is present as an alloy with silver and tin (4 vol %). The majority is a eutectic mixture of the red phase (30 vol %), the green phase (46 vol %), and the blue phase (20 vol %).

FIG. 27 shows a SEM Elemental Map of the 65% tin, 20% indium, 12% zinc, 3% silver. Most of zinc is present as an alloy with silver and tin (13 vol %). Majority is a eutectic mixture of the red phase (46 vol %) and the blue phase (41 vol %).

Summary of Microstructural Data

10. Production Sample Validation

Larger production size ingots were made and sent through the normal production process:

Alloy melt
Ingot pour
Roll to thickness
Slit to size
Reflowed to base
Tin plate
Stamp DSC and ICP was run on the solder ingot and finished parts were soldered to glass. Temperature cycling for glass cracks and creep test for high temperature exposure were done to validated previous results.

We claim:

1. An electrical assembly, comprising:
  an electrical connector having a first layer formed of a copper based material and a second layer formed of an iron-nickel alloy, wherein the second layer has a thickness 8% to 30% of the thickness of the electrical connector; and
  a layer of a solder alloy consisting essentially of:
  about 15% to 28% indium by weight;
  about 5% to 20% zinc by weight;
  about 1% to 6% silver by weight; and
  a remaining weight of the solder alloy being tin.

2. The electrical assembly according to claim 1, wherein the solder alloy consists essentially of:
  21% to 27% indium by weight;
  8% to 10% zinc by weight;
  2% to 4% silver by weight; and
  a remaining weight of the solder alloy being tin.

3. The electrical assembly according to claim 1, wherein the solder alloy consists essentially of:
  about 24% indium by weight;
  about 9% zinc by weight;
  about 3% silver by weight; and
  a remaining weight of the solder alloy being tin.

4. The electrical assembly according to claim 1, wherein the second layer is soldered to a silver-based connection pad.

5. The electrical assembly according to claim 4, wherein the silver-based connection pad is disposed on a glass surface.

6. An electrical assembly, comprising:
  an electrical connector having a first layer formed of a copper based material and a second layer formed of an iron-nickel alloy, wherein the second layer has a thickness 8% to 30% of the thickness of the electrical connector and wherein the electrical connector is soldered to a conductive pad disposed on a glass surface by a solder alloy consisting essentially of:
  17% to 28% indium by weight;
  12% to 20% zinc by weight;
  1% to 6% silver by weight; and
  a remaining weight of the solder alloy being tin.

7. The electrical assembly according to claim 6, wherein the solder alloy includes 23% to 26% indium by weight.

8. The electrical assembly according to claim 6, wherein the solder alloy includes 24% to 26% indium by weight.

9. The electrical assembly according to claim 6, wherein the solder alloy includes 25% to 26% indium by weight.

10. The electrical assembly according to claim 6, wherein the solder alloy includes 5.5% to 6% silver by weight.

11. The electrical assembly according to claim 6, wherein the solder alloy includes 5.75% to 6% silver by weight.

12. An electrical assembly, comprising:
  an electrical connector having a first layer formed of a copper based material and a second layer formed of an iron-nickel alloy, wherein the second layer has a thickness 8% to 30% of the thickness of the electrical connector and wherein the electrical connector is soldered to a conductive pad disposed on a glass surface by a solder alloy consisting essentially of:
  17% to 28% indium by weight;
  12% to 20% zinc by weight;
  1% to 6% silver by weight;
  1% to 3% copper by weight; and
  a remaining weight of the solder alloy being tin.

13. The electrical assembly according to claim 12, wherein the solder alloy includes 23% to 26% indium by weight.

14. The electrical assembly according to claim 12, wherein the solder alloy includes 24% to 26% indium by weight.

15. The electrical assembly according to claim 12, wherein the solder alloy includes 25% to 26% indium by weight.

16. The electrical assembly according to claim 12, wherein the solder alloy includes 5.5% to 6% silver by weight.

17. The electrical assembly according to claim 12, wherein the solder alloy includes 5.75% to 6% silver by weight.

* * * * *